United States Patent
Liu et al.

(10) Patent No.: US 9,401,968 B2
(45) Date of Patent: Jul. 26, 2016

(54) METHOD AND APPARATUS FOR ENABLING PRE-FETCHING OF MEDIA

(75) Inventors: Chenghao Liu, Tampere (FI); Miska Hannuksela, Ruutana (FI)

(73) Assignee: Nokia Techologies Oy, Espoo (FI)

( * ) Notice: Subject to any disclaimer, the term of this patent is extended or adjusted under 35 U.S.C. 154(b) by 1002 days.

(21) Appl. No.: 13/354,633

(22) Filed: Jan. 20, 2012

(65) Prior Publication Data

US 2013/0191511 A1    Jul. 25, 2013

(51) Int. Cl.
    *G06F 15/16*     (2006.01)
    *H04L 29/08*     (2006.01)
    *H04L 29/06*     (2006.01)
    *G06F 15/173*     (2006.01)

(52) U.S. Cl.
    CPC .......... *H04L 67/2847* (2013.01); *H04L 65/105* (2013.01); *H04L 65/1006* (2013.01); *H04L 65/1016* (2013.01); *H04L 65/4084* (2013.01); *H04L 65/80* (2013.01); *H04L 67/02* (2013.01)

(58) Field of Classification Search
    CPC ............ H04L 67/2847; H04L 65/1006; H04L 65/1016; H04L 65/105; H04L 65/4084; H04L 65/80; H04L 67/02
    USPC ........................................................ 709/219
    See application file for complete search history.

(56) References Cited

U.S. PATENT DOCUMENTS

| | | | |
|---|---|---|---|
| 6,289,358 B1 | 9/2001 | Mattis et al. | |
| 6,539,164 B2 | 3/2003 | Shirakawa et al. | |
| 6,708,213 B1 * | 3/2004 | Bommaiah et al. | 709/226 |
| 6,768,992 B1 | 7/2004 | Jolitz | |
| 6,868,439 B2 * | 3/2005 | Basu et al. | 709/213 |
| 7,103,595 B2 * | 9/2006 | Anastasiadis et al. | |
| 7,389,533 B2 * | 6/2008 | Bartlett et al. | 726/15 |

(Continued)

FOREIGN PATENT DOCUMENTS

| | | |
|---|---|---|
| CN | 102232298 A | 11/2011 |
| GB | 2481529 A | 12/2011 |

(Continued)

OTHER PUBLICATIONS

Zambelli, Alex, "IIS Smooth Streaming Technical Overview," Microsoft Corporation, Mar. 2009, 17 pages, downloaded from http://www.microsoft.com/download/en/details.aspx?displaylang=en&id=17678 on Feb. 7, 2012.

Färber, Nickolaus, et al., "Adaptive Progressive Download Based on the MPEG-4 File Format," in *Proceedings of International Packet Video Workshop*, 2006, vol. 7, Suppl. 1, pp. 106-111, Zhejiang University Science.

(Continued)

*Primary Examiner* — Melvin H Pollack
(74) *Attorney, Agent, or Firm* — Alston & Bird LLP

(57) ABSTRACT

Various methods are described for enabling efficient pre-fetching of media in a DASH system. One example method may comprise accessing information related to a media presentation description (MPD). The information comprising information related to one or more segments of the MPD. The method of this example embodiment may further comprise generating a request for a segment of the MPD. Furthermore, the method of this example embodiment may comprise generating a request for pre-fetching one or more segments different from the requested segment. The method of this example embodiment may further comprise providing for transmission of the request for the segment and the request for pre-fetching the one or more different segments to a proxy cache server. Similar and related example methods, example apparatuses, and example computer program products are also provided.

17 Claims, 18 Drawing Sheets

(56) References Cited

U.S. PATENT DOCUMENTS

| | | | |
|---|---|---|---|
| 7,573,826 B1 | 8/2009 | Beshai et al. | |
| 7,783,772 B2 | 8/2010 | Klemets | |
| 8,111,630 B2* | 2/2012 | Kovvali et al. | 370/252 |
| 8,370,452 B2* | 2/2013 | Harvell et al. | 709/217 |
| 8,468,262 B2* | 6/2013 | Furbeck | 709/231 |
| 8,516,074 B2* | 8/2013 | Courtemanche et al. | 709/217 |
| 8,561,116 B2* | 10/2013 | Hasek | 725/92 |
| 8,677,005 B2* | 3/2014 | Wang et al. | 709/231 |
| 8,694,669 B2* | 4/2014 | Park et al. | 709/231 |
| 8,717,890 B2* | 5/2014 | Kovvali et al. | 370/232 |
| 8,782,268 B2* | 7/2014 | Pyle et al. | 709/231 |
| 8,799,759 B2* | 8/2014 | Falkenberg et al. | 715/205 |
| 8,812,621 B2* | 8/2014 | Begen et al. | 709/219 |
| 8,849,950 B2* | 9/2014 | Stockhammer et al. | 709/217 |
| 8,880,633 B2* | 11/2014 | Brookins et al. | 709/213 |
| 8,909,805 B2* | 12/2014 | Thang et al. | 709/230 |
| 8,925,021 B2* | 12/2014 | Ma et al. | 725/90 |
| 8,977,704 B2 | 3/2015 | Liu et al. | |
| 9,021,047 B2* | 4/2015 | Marquess et al. | 709/213 |
| 9,072,972 B2* | 7/2015 | Ahiska et al. | 709/223 |
| 2004/0049579 A1* | 3/2004 | Ims et al. | 709/225 |
| 2004/0054777 A1 | 3/2004 | Ackaouy et al. | |
| 2004/0064577 A1 | 4/2004 | Dahlin et al. | |
| 2005/0125533 A1* | 6/2005 | Svanbro et al. | 709/225 |
| 2005/0273514 A1 | 12/2005 | Milkey et al. | |
| 2006/0120326 A1 | 6/2006 | Takeuchi et al. | |
| 2008/0244218 A1 | 10/2008 | Dzierzon et al. | |
| 2008/0282298 A1 | 11/2008 | Ganesan et al. | |
| 2009/0006583 A1 | 1/2009 | Kindle et al. | |
| 2010/0169303 A1 | 7/2010 | Biderman et al. | |
| 2010/0174823 A1 | 7/2010 | Huang | |
| 2010/0235472 A1 | 9/2010 | Sood et al. | |
| 2010/0235528 A1 | 9/2010 | Bocharov et al. | |
| 2010/0239078 A1 | 9/2010 | Sweeney et al. | |
| 2011/0179449 A1 | 7/2011 | Ganesan et al. | |
| 2011/0295979 A1* | 12/2011 | Alstad et al. | 709/219 |
| 2011/0307545 A1 | 12/2011 | Bouazizi | |
| 2011/0307781 A1 | 12/2011 | Sood et al. | |
| 2012/0016965 A1 | 1/2012 | Chen et al. | |
| 2012/0042050 A1 | 2/2012 | Chen et al. | |
| 2012/0096106 A1* | 4/2012 | Blumofe et al. | 709/213 |
| 2012/0124179 A1 | 5/2012 | Cappio et al. | |
| 2012/0166667 A1* | 6/2012 | Hall | 709/231 |
| 2012/0216038 A1* | 8/2012 | Chen et al. | 713/168 |
| 2012/0278495 A1* | 11/2012 | Furbeck | 709/231 |
| 2012/0284371 A1 | 11/2012 | Begen et al. | |
| 2012/0290644 A1* | 11/2012 | Gabin et al. | 709/203 |
| 2013/0103849 A1* | 4/2013 | Mao et al. | 709/231 |
| 2013/0182643 A1* | 7/2013 | Pazos et al. | 370/328 |
| 2013/0254418 A1* | 9/2013 | Zhang | 709/231 |
| 2013/0290493 A1* | 10/2013 | Oyman et al. | 709/219 |
| 2013/0291040 A1* | 10/2013 | Rhyu et al. | 725/109 |
| 2013/0298170 A1* | 11/2013 | ElArabawy et al. | 725/62 |
| 2014/0032777 A1* | 1/2014 | Yuan et al. | 709/231 |
| 2014/0089518 A1* | 3/2014 | Zhang et al. | 709/231 |
| 2014/0115647 A1* | 4/2014 | Kim et al. | 725/110 |
| 2014/0153504 A1* | 6/2014 | Wang et al. | 370/329 |
| 2014/0219088 A1* | 8/2014 | Oyman et al. | 370/231 |
| 2014/0245359 A1* | 8/2014 | De Foy et al. | 725/62 |
| 2014/0258552 A1* | 9/2014 | Oyman et al. | 709/231 |
| 2014/0317234 A1* | 10/2014 | Mueller et al. | 709/217 |
| 2014/0380113 A1* | 12/2014 | Luby et al. | 714/752 |

FOREIGN PATENT DOCUMENTS

| | | |
|---|---|---|
| IN | 2145/CHE2011 A | 7/2011 |
| WO | WO 00/58870 A2 | 10/2000 |
| WO | WO 2011/057012 A1 | 5/2011 |
| WO | WO 2011/070552 A1 | 6/2011 |
| WO | WO 2011/087449 A1 | 7/2011 |
| WO | WO 2011/090715 A2 | 7/2011 |
| WO | WO 2011/139305 A1 | 11/2011 |

OTHER PUBLICATIONS

Author Unknown, "HTTP Dynamic Streaming on the Adobe Flash Platform," Technical White Paper, 2010, Adobe Systems Incorporated, 18 pages, downloaded from http://www.adobe.com/products/httpdynamicstreaming/pdfs/httpdynamicstreaming_wp_ue.pdf on Feb. 7, 2012.

Hartung, Frank, "Transparent End-To-End Packet-Switched Streaming Service (PSS); Protocols and Codecs," 3GPP TS 26.234 Release 9, Jun. 2001, 10 pages, downloaded from http://itg32.hhi.de/docs/ITG312_EED_01_1_053.pdf on Feb. 7, 2012.

International Organization for Standardization and International Electrotechnical Commission (ISO and IEC) Members, "Information Technology—Dynamic Adaptive Streaming Over HTTP (DASH)—Part 1: Media Presentation Description and Segment Formats," Draft International Standard, ISO/IEC 23009-1, Aug. 30, 2011, 131 pages.

3rd Generation Partnership Project Members, "Transparent End-To-End Packet-Switched Streaming Service (PSS); Progressive Download and Dynamic Adaptive Streaming Over HTTP (3GP-DASH)," 3rd Generation Partnership Project, Technical Specification Group Services and System Aspects, Jun. 2011, 3GPP TS 26.247, Release 10, vol. 10.0.0, 94 pages.

Fielding, R., et al., "HTTP/1.1, part 1: URIs, Connections, and Message Parsing," HTTPbis Working Group, Aug. 24, 2011, 98 pages, downloaded from http://tools.ietf.org/html/draft-ietf-httpbis-p1-messaging-16 on Feb. 7, 2012.

Fielding, R., et al., "HTTP/1.1, part 6: Caching," HTTPbis Working Group, Aug. 24, 2011, 46 pages, downloaded from http://tools.ietf.org/html/draft-ietf-httpbis-p6-cache-16 on Feb. 7, 2012.

Rejaie, Reza, et al., "Multimedia Proxy Caching Mechanism for Quality Adaptive Streaming Applications in the Internet," *IEEE INFOCOM 2000*, Mar. 2000, 11 pages.

Chen, Songqing, et al., "Segment-Based Proxy Caching for Internet Streaming Media Delivery," Journal of IEEE Multimedia, Jul. 2005, vol. 12, Issue 3, 9 pages.

Wang, James Z., et al., "Fragmental Proxy Caching for Streaming Multimedia Objects," *IEEE Transactions on Multimedia*, Jan. 2007, vol. 9, No. 1, pp. 147-156.

Wu, Kun-Lung, et al., "Segmentation of Multimedia Streams for Proxy Caching," *IEEE Transactions on Multimedia*, Oct. 2004, vol. 6, Issue 5, pp. 770-780.

Liu, Chenghao, et al., "Rate Adaptation for Adaptive HTTP Streaming," *Proceedings of ACM MMSys 2011, Special Session: Modern Media Transport, Dynamic Adaptive Streaming over HTTP (DASH)*, Feb. 23-25, 2011, California, pp. 169-174.

Liu, Chenghao, et al., "Parallel Adaptive HTTP Media Streaming," *IEEE International Conference on Computer Communications and Networks*, Jul. 31-Aug. 4, 2011, Hawaii, 6 pages.

Liu, Chenghao, et al., "Signal Processing: Image Communication, Rate Adaptation for Dynamic Adaptive Streaming Over HTTP in Content Distribution Network," *Signal Processing: Image Communication*, 2011, 24 pages.

Fielding, R., et al., "HTTP/1.1, Part 5: Range Request and Partial Responses," HTTPbis Working Group, Oct. 31, 2011, 31 pages, downloaded from http://tools.ietf.org/html/draft-ietf-httpbis-p5-range-02 on Feb. 8, 2012.

Fielding, R., et al. "Hypertext Transfer Protocol—HTTP/1.1," Network Working Group, Jan. 1997, RFC 2068, 152 pages, downloaded from http://www.ietf.org/rfc/rfc2068.txt on Feb. 8, 2012.

Fielding, R., et al., "Hypertext Transfer Protocol—HTTP/1.1," Network Working Group, Jun. 1999, RFC 2616, 165 pages, downloaded from http://www.ietf.org/rfc/rfc2616.txt on Feb. 8, 2012.

3rd Generation Partnership Project Membership, "Transparent End-To-End Packet-Switched Streaming Service (PSS); Protocols and Codecs," 3rd Generation Partnership Project Technical Specification Group Services and System Aspects, 3GPP TS26.234, Release 9, Sep. 2009, vol. 9.0.0.

U.S. Appl. No. 13/340,123, filed Dec. 29, 2011, In re: Liu, entitled *Method and Apparatus for Flexible Caching of Delivered Media*.

Office Action for U.S. Appl. No. 13/340,123, dated May 17, 2013.

(56) References Cited

OTHER PUBLICATIONS

International Search Report for Application No. PCT/FI2013/050051 dated May 24, 2013.
Fielding, R. et al., HTTP/1.1, part 3: Message Payload and Content Negotiation draft-ietf-httpbis-p3-payload-16, 2616 (if approved), dated Aug. 24, 2011 [online] [retrieved Oct. 11, 2012]. Retrieved from the Internet: <URL:http://tools.ietf.org/html/draft-ietf-httpbis-p3-payload-16>. 44 pages.
Berners-Lee, T. et al., *Uniform Resource Identifier(URI): Generic Syntax*, RFC 3986, Jan. 2005, 61 pages.
Extended European Search Report for corresponding European Application No. 12862371.7 dated Jul. 29, 2015.
Extended European Search Report for corresponding European Application No. 13738088.7 dated Aug. 4, 2015.
Stockhammer, T., *Dynamic Adaptive Streaming over HTTP-Design Principles and Standards*, Qualcomm Incorporated, Second W3C Web and TV Workshop, (Jan. 2011) Retrieved from the internet: <URL:http://www.w3.org/2010/11/web-and-tv/papers.html> pp. 1-3.
Lanker, W. V. et al., *HTTP Adaptive Streaming With Media Fragment Uris*, IEEE International Conference on Multimedia and Expo (ICME Jan. 2011) pp. 1-6.
International Search Report and Written Opinion for Application No. PCT/FI2012/051189 dated May 13, 2013.
International Written Opinion for Application No. PCT/FI2013/050051 dated May 24, 2013.
Office Action from U.S. Appl. No. 13/340,123, dated Nov. 13, 2013.
Notice of Allowance from U.S. Appl. No. 13/340,123, dated Oct. 2, 2014.
Notice of Allowance from U.S. Appl. No. 13/340,123, dated Feb. 6, 2015.
Office Action for Chinese Application No. 201280065154.8 dated Mar. 22, 2016.
Office Action for U.S. Appl. No. 14/579,183, dated Feb. 16, 2016.

\* cited by examiner

```
Pre-Fetching-Segment = #(Pre-Fetch-Segments-URI-Template OWS ";" OWS
  ("representationID/Number=" pre-fetch-representationid-segmentnumber-rangespec)
  /("Bandwidth/Number=" pre-fetch-bandwidth-segmentnumber-rangespec)
  /("representationID/Time=" pre-fetch-representationid-segmenttime-rangespec)
  /("Bandwidth/Time=" pre-fetch-bandwidth-segmenttime-rangespec)
  )

Pre-Fetch-Segments-URI-Template = http ":" hier-part [ "?" query ] [ "#" fragment ]
hier-part    = "//" authority path-abempty
             / path-absolute
             / path-rootless
             / path-empty
             ; as specified in RFC 3986, but including placeholders
```

FIG. 10a

```
pre-fetch-representationid-segmentnumber-rangespec=((pre-fetch-representationid-segmentnumber-range)
                                                   / (pre-fetch-representationid-segmentnumber-list))
pre-fetch-representationid-segmentnumber-range= representationid"&"pre-fetch-segmentnumber-range
                          * (","representationid"&"pre-fetch-segmentnumber-range)
                          [accept-params]

pre-fetch-segmentnumber-range=( [segmentnumber]"-"[segmentnumber])
pre-fetch-representationid-segmentnumber-list= representationid"&" segmentnumber
                          * ("," representationid"&" segmentnumber) [accept-params]

pre-fetch-bandwidth-segmentnumber-rangespec=((pre-fetch-bandwidth-segmentnumber-range)
                                             / (pre-fetch-bandwidth-segmentnumber-list))
pre-fetch-bandwidth-segmentnumber-range= bandwidth"&"pre-fetch-segmentnumber-range
                          * (","bandwidth"&"pre-fetch-segmentnumber-range) [accept-params]
pre-fetch-bandwidth-segmentnumber-list= bandwidth"&" segmentnumber
                          * ("," bandwidth"&" segmentnumber) [accept-params]

pre-fetch-representationid-segmenttime-rangespec=((pre-fetch-representationid-segmenttime-range)
                                                  / (pre-fetch-representationid-segmenttime-list))
pre-fetch-representationid-segmenttime-range= representationid"&"pre-fetch-segmenttime-range
                          * (","representationid"&"pre-fetch-segmenttime-range) [accept-params]
pre-fetch-segmenttime-range=( [segmenttime]"-"[segmenttime])
pre-fetch-representationid-segmenttime-list= representationid"&" segmenttime
                          * ("," representationid"&" segmenttime) [accept-params]

pre-fetch-bandwidth-segmenttime-rangespec=((pre-fetch-bandwidth-segmenttime-range)
                                           / (pre-fetch-bandwidth-segmenttime-list))
pre-fetch-bandwidth-segmenttime-range= bandwidth"&"pre-fetch-segmenttime-range
                          * (","bandwidth"&"pre-fetch-segmenttime-range) [accept-params]
pre-fetch-bandwidth-segmenttime-list= bandwidth"&" segmenttime
                          * ("," bandwidth"&" segmenttime) [accept-params]
```

FIG. 10b

```
representationid =   *(DIGIT/ALPHA)
bandwidth =          *DIGIT segmentnumber=       *DIGIT
segmenttime=         *DIGIT accept-params = ([OWS ";" OWS "q=" qvalue] / [OWS ";" OWS "q=" qvalue-range])
qvalue-range = qvalue "-" qvalue
qvalue = ( "0" [ "." 0*3DIGIT ] ) | ( "1" [ "." 0*3("0") ] ) ; as specified in RFC 2616
```

FIG. 10c

```
Retrieve-Subsequent-Segments-Caching-Status =
 # (Ret-Subsequent-Segments-URI-Template OWS ";" OWS
    ("representationID/Number=" subsequent-representationid-segmentnumber-rangespec)
    /("Bandwidth/Number=" subsequent-bandwidth-segmentnumber-rangespec)
    /("representationID/Time=" subsequent-representationid-segmenttime-rangespec)
    /("Bandwidth/Time=" subsequent-bandwidth-segmenttime-rangespec)
  )

Ret-Subsequent-Segments-URI-Template = http ":" hier-part [ "?" query ] [ "#" fragment ]
hier-part   = "//" authority path-abempty
            / path-absolute
            / path-rootless
            / path-empty
            ; as specified in RFC 3986, but including placeholders
```

FIG. 11a

```
subsequent-representationid-segmentnumber-rangespec=((subsequent-representationid-segmentnumber-range)
                                                    / (subsequent-representationid-segmentnumber-list))
subsequent-representationid-segmentnumber-range= representationid"&"subsequent-segmentnumber-range
                                                    * (",","representationid"-"[segmentnumber])
subsequent-segmentnumber-range=( [segmentnumber]"-"[segmentnumber])
subsequent-representationid-segmentnumber-list= representationid"&"segmentnumber
                                                    * (",", representationid"&"segmentnumber)

subsequent-bandwidth-segmentnumber-rangespec=((subsequent-bandwidth-segmentnumber-range)
                                               / (subsequent-bandwidth-segmentnumber-list))
subsequent-bandwidth-segmentnumber-range= bandwidth"&"subsequent-segmentnumber-range
                                               * (",","bandwidth"&"subsequent-segmentnumber-range)
subsequent-bandwidth-segmentnumber-list= bandwidth"&" segmentnumber * (",", bandwidth"&"segmentnumber)

subsequent-representationid-segmenttime-rangespec=((subsequent-representationid-segmenttime-range)
                                                    / (subsequent-representationid-segmenttime-list))
subsequent-representationid-segmenttime-range= representationid"&"subsequent-segmenttime-range
                                                    * (",","representationid"-"[segmenttime])
subsequent-segmenttime-range=( [segmenttime]"-"[segmenttime])
subsequent-representationid-segmenttime-list= representationid"&"segmenttime
                                                    * (",", representationid"&"segmenttime)

subsequent-bandwidth-segmenttime-rangespec=((subsequent-bandwidth-segmenttime-range)
                                             / (subsequent-bandwidth-segmenttime-list))
subsequent-bandwidth-segmenttime-range= bandwidth"&"subsequent-segmenttime-range
                                             * (",","bandwidth"&"subsequent-segmenttime-range)
subsequent-bandwidth-segmenttime-list= bandwidth"&"segmenttime * (",", bandwidth"&"segmenttime)

representationid = *(DIGIT/ALPHA)
bandwidth =        *DIGIT segmentnumber=     *DIGIT
segmenttime=       *DIGIT
```

FIG. 11b

```
Proxy-Subsequent-Segments-Caching-Status = #(Proxy-Subsequent-Segments-URI-Template OWS ";" OWS
                                              cachingstatus-subsequent-segments-listspec)

Proxy-Subsequent-Segments-URI-Template = http ":" hier-part [ "?" query ] [ "#" fragment ]
hier-part    = "//" authority path-abempty
             / path-absolute
             / path-rootless
             / path-empty
             ; as specified in RFC 3986, but including placeholders cachingstatus-subsequent-segments-listspec=
    ((cachingstatus-subsequent-representationid-segmentnumber-list)
    /(cachingstatus-subsequent-bandwidth-segmentnumber-list)
    /(cachingstatus-subsequent-representationid-segmenttime-list)
    /(cachingstatus-subsequent-bandwidth-segmenttime-list))

cachingstatus-subsequent-representationid-segmentnumber-list=
        representationid"&"segmentnumber OWS ";" OWS "CS=" cachingstatus [rec-segment-bitrate-params]
    *("," representationid"&"segmentnumber OWS ";" OWS "CS=" cachingstatus [rec-segment-bitrate-params])

cachingstatus-subsequent-bandwidth-segmentnumber-list=
        bandwidth"&"segmentnumber OWS ";" OWS "CS=" cachingstatus [rec-segment-bitrate-params]
    *("," bandwidth"&"segmentnumber OWS ";" OWS "CS=" cachingstatus [rec-segment-bitrate-params])

cachingstatus-subsequent-representationid-segmenttime-list=
        representationid"&"segmenttime OWS ";" OWS "CS=" cachingstatus [rec-segment-bitrate-params]
    *("," representationid"&"segmenttime OWS ";" OWS "CS=" cachingstatus [rec-segment-bitrate-params])

cachingstatus-subsequent-bandwidth-segmenttime-list=
        bandwidth "&" segmenttime OWS ";" OWS "CS=" cachingstatus [rec-segment-bitrate-params]
    *("," bandwidth "&" segmenttime OWS ";" OWS "CS=" cachingstatus [rec-segment-bitrate-params])
```

FIG. 12a

```
representationid=*(DIGIT/ALPHA)
bandwidth=         *DIGIT
segmenttime=       *DIGIT
segmentnumber=     *DIGIT cachingstatus=     *(DIGIT/ALPHA)

rec-segment-bitrate-params= OWS ";" OWS
                   "TSFP=" time-startfetch-atproxy (
                       (OWS ";" OWS "BR-R2P=" bitrate-r2p)
                      /(OWS ";" OWS "SFT-R2P=" sftr2p)
                      /(OWS ";" OWS "latency-R2P=" latency-r2p))

bitrate-r2p=       *DIGIT
sftr2p=            *(DIGIT/ALPHA)
latency-r2p=       *DIGIT
```

FIG. 12b

```
Nested-Connection= #(Nested-Connection-Counter* (",",Nested-Connection-Counter))

Nested-Connection-Counter= "Nested-Connection-" counter"="
    ((Pre-Fetching-Segment)
    /(Retrieve-Subsequent-Segments-Caching-Status)
    /(Proxy-Subsequent-Segments-Caching-Status))

counter=*DIGIT
```

FIG. 13

METHOD AND APPARATUS FOR ENABLING PRE-FETCHING OF MEDIA

TECHNICAL FIELD

Embodiments of the present invention relate generally to communication technology, and, more particularly, relate to a method and apparatus for enabling efficient pre-fetching of media in a DASH system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. In order to provide easier or faster information transfer and convenience, telecommunication industry service providers are developing improvements to existing networks. In this regard, for example, improvements are being made to the universal mobile telecommunications system (UMTS) terrestrial radio access network (UTRAN). Further, for example, the evolved-UTRAN (E-UTRAN) is currently being developed. The E-UTRAN, which is also known as Long Term Evolution (LTE), is aimed at upgrading prior technologies by improving efficiency, lowering costs, improving services, making use of new spectrum opportunities, and providing better integration with other open standards.

As a result of improved networking technologies, the capacity for visual and audible media content distribution over the Internet has continued to increase. Users desire efficient and optimized access to this growing amount of media content through various access methods. An emerging standard for distributing media content to devices is known as dynamic adaptive streaming over Hypertext Transfer Protocol (HTTP) (DASH). The media retrieval process according to DASH may be less efficient when requested media must always be retrieved from an origin server.

Accordingly, it may be desirable to provide systems, methods, apparatuses, and computer program products for enabling efficient pre-fetching of media in a DASH system.

SUMMARY

Methods, apparatuses, and computer program products are herein provided for enabling efficient pre-fetching of media in a DASH system. In an example embodiment, a method is provided, which may comprise accessing, via a processor, information related to a media presentation description (MPD). The information comprising information related to one or more segments of the MPD. The method of this example embodiment may further comprise generating a request for a segment of the MPD. The method of this example embodiment may also comprise generating a request for pre-fetching one or more segments different from the requested segment. The method of this example embodiment may further comprise providing for transmission of the request for the segment and the request for pre-fetching the one or more different segments to a proxy cache server.

In another example embodiment, an apparatus comprising at least one processor and at least one memory storing computer program code is provided. The at least one memory and stored computer program code may be configured, with the at least one processor, to cause the apparatus of this example embodiment to at least access information related to a media presentation description (MPD). The information comprising information related to one or more segments of the MPD. The at least one memory and stored computer program code may be configured, with the at least one processor, to further cause the apparatus of this example embodiment to generate a request for a segment of the MPD. Furthermore, the at least one memory and stored computer program code may be configured, with the at least one processor, to cause the apparatus of this example embodiment to generate a request for pre-fetching one or more segments different from the requested segment. The at least one memory and stored computer program code may be configured, with the at least one processor, to further cause the apparatus of this example embodiment to provide for transmission of the request for the segment and the request for pre-fetching the one or more different segments to a proxy cache server.

In another example embodiment, a computer program product is provided. The computer program product of this example embodiment may comprise at least one non-transitory computer-readable storage medium having computer program code stored thereon, wherein the computer program code, when executed by an apparatus (e.g., one or more processors), causes the apparatus to perform various functionalities. In this regard, the program code may cause the apparatus to access information related to a media presentation description (MPD). The information comprising information related to one or more segments of the MPD. The program code may further cause the apparatus to generate a request for a segment of the MPD. Additionally, the program code may cause the apparatus to generate a request for pre-fetching one or more segments different from the requested segment. The program code of this embodiment may further cause the apparatus to provide for transmission of the request for the segment and the request for pre-fetching the one or more different segments to a proxy cache server.

In another example embodiment, an apparatus is provided, which may comprise means for accessing, via a processor, information related to a media presentation description (MPD). The information comprising information related to one or more segments of the MPD. The apparatus of this example embodiment may further comprise means for generating a request for a segment of the MPD. Furthermore, the apparatus of this example embodiment may comprise means for generating a request for pre-fetching one or more segments different from the requested segment. The apparatus of this example embodiment may further comprise means for providing for transmission of the request for the segment and the request for pre-fetching the one or more different segments to a proxy cache server.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described some example embodiments of the invention in general terms, reference will now be made to the accompanying drawings, which are not necessarily drawn to scale, and wherein:

Figure 8A:
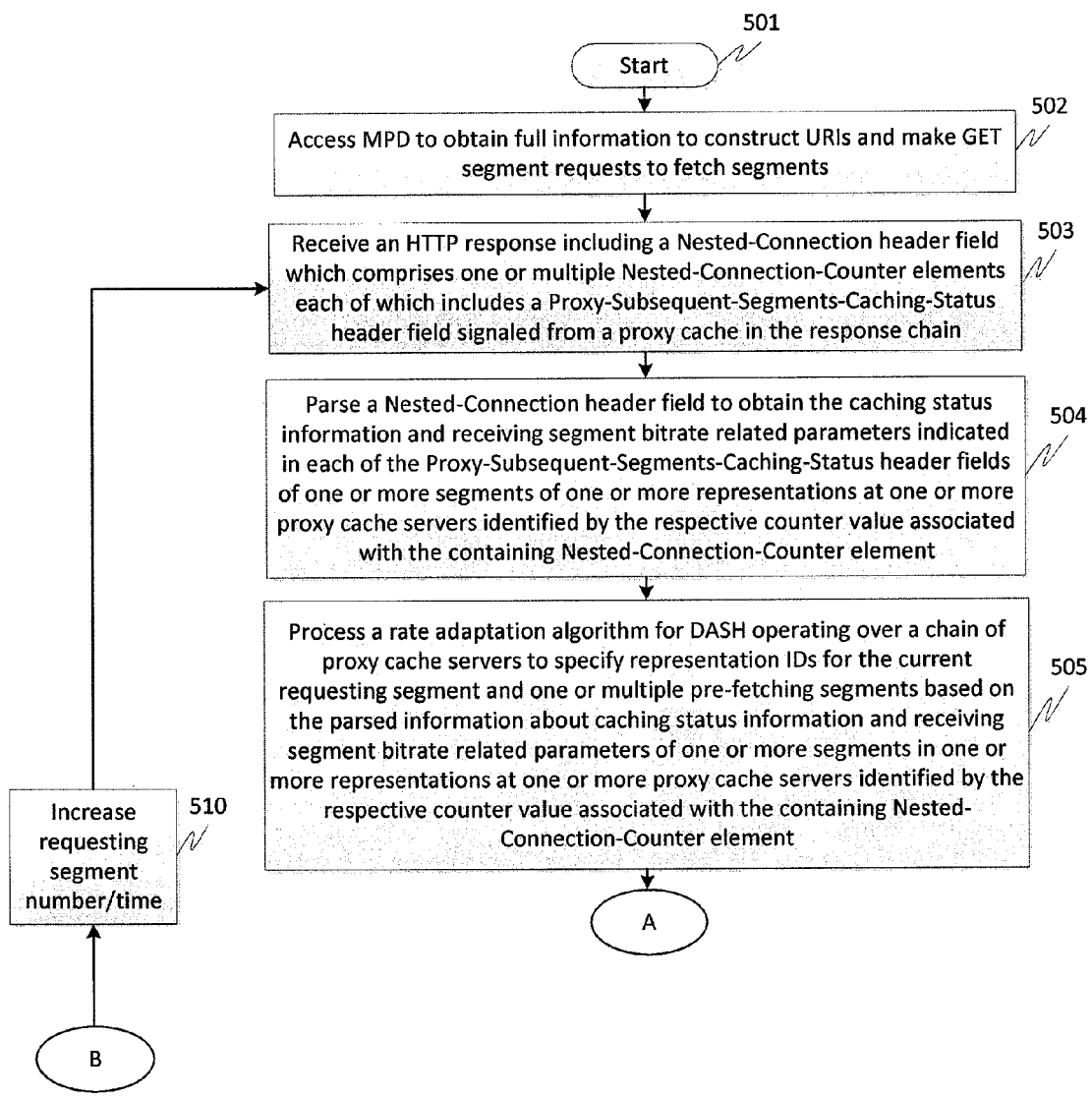
Figure 8B:
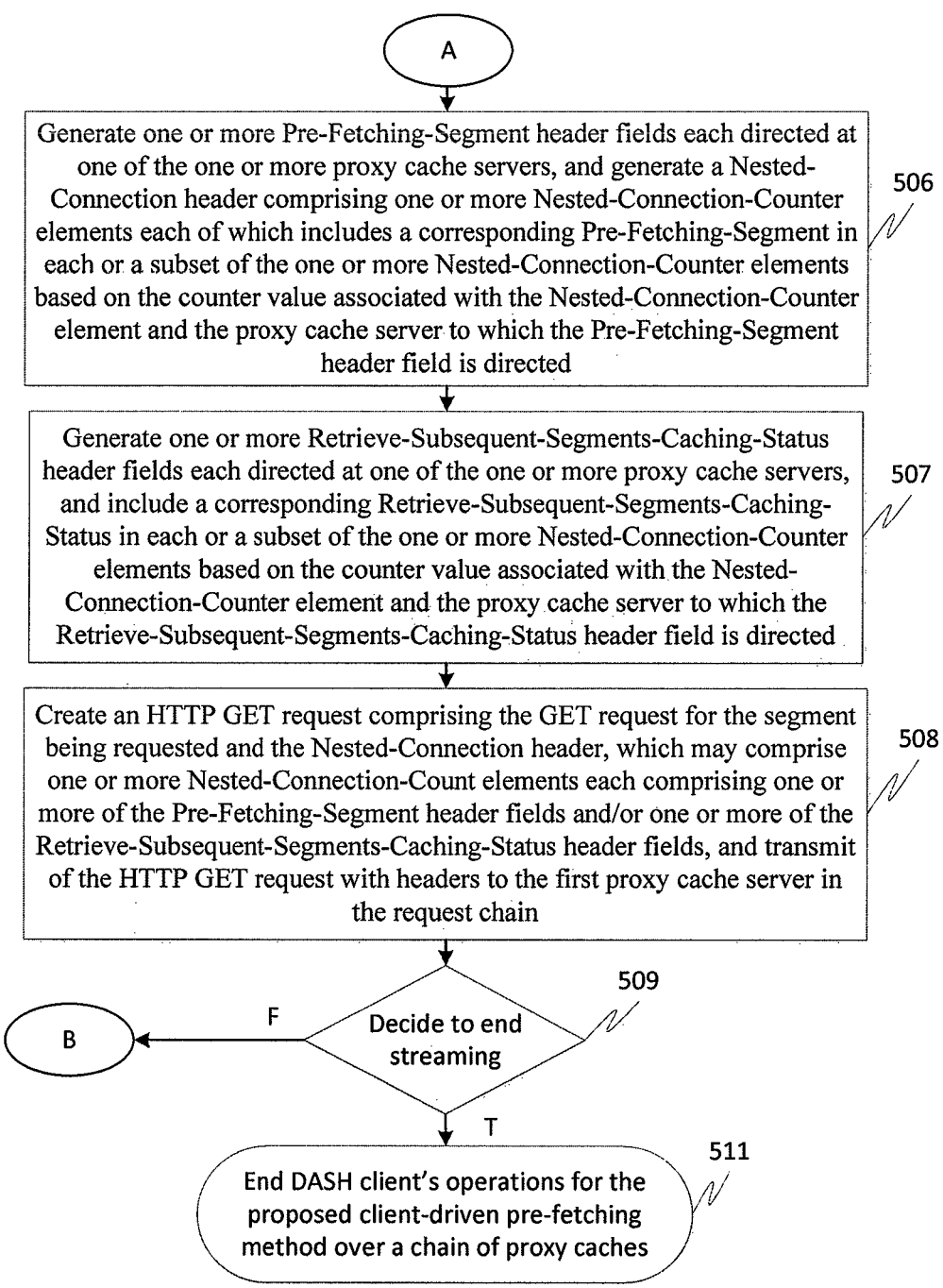
Figure 9:
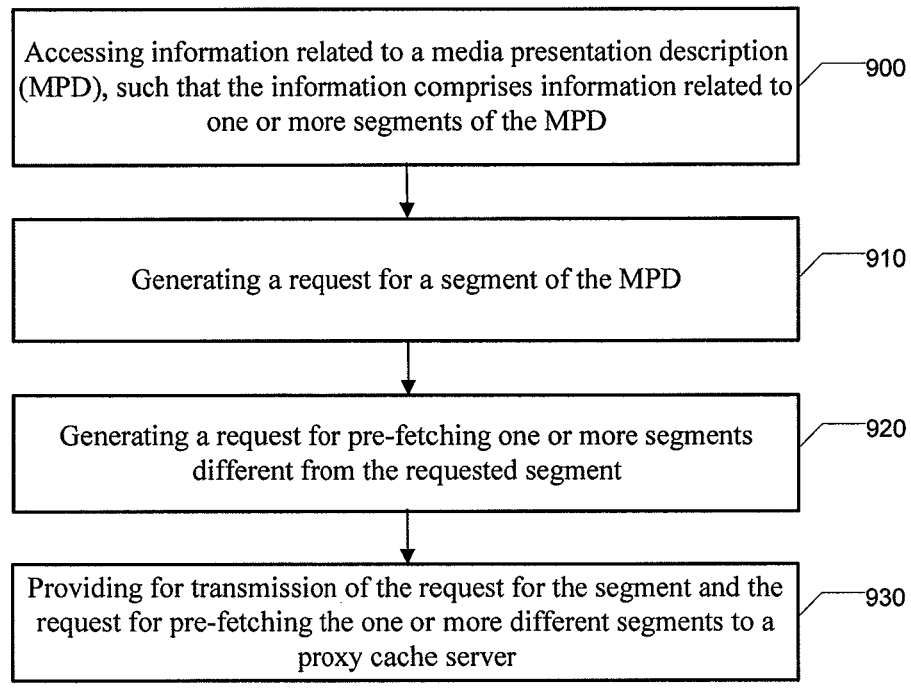

FIGS. 8*a*-8*b* illustrate a flowchart of operations performed by a DASH client according to an example method for enabling efficient pre-fetching of media in a DASH system according to some example embodiments of the present invention;

FIG. 9 illustrates a flowchart of operations performed by a DASH client according to an example method for enabling efficient pre-fetching of media in a DASH system according to some example embodiments of the present invention;

FIGS. 10*a*-10*c* illustrate a definition of a Pre-Fetching-Segment header in Augmented Backus-Naar Form.

FIGS. 10*a*-10*b* illustrate a definition of a Retrieve-Subsequent-Segments-Caching-Status header in Augmented Backus-Naur Form.

FIGS. 12*a*-12*b* illustrate a definition of a Proxy-Subsequent-Segments-Caching-Status header in Augmented Backus-Naur Form.

FIG. 13 illustrates a definition of a Nested-Connection header in Augmented Backus-Naur Form.

DETAILED DESCRIPTION

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

The terms "data," "content," "information," and similar terms may be used interchangeably, according to some example embodiments of the present invention, to refer to data capable of being transmitted, received, operated on, displayed, and/or stored. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (for example, non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a floppy disk, a flexible disk, hard disk, magnetic tape, any other non-transitory magnetic medium, a compact disc read only memory (CD-ROM), compact disc compact disc-rewritable (CD-RW), digital versatile disc (DVD), Blu-Ray, any other non-transitory optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

As used herein, the term 'circuitry' refers to all of the following: (a) hardware-only circuit implementations (such as implementations in only analog and/or digital circuitry); (b) to combinations of circuits and computer program product(s) comprising software (and/or firmware instructions stored on one or more computer readable memories), such as (as applicable): (i) to a combination of processor(s) or (ii) to portions of processor(s)/software (including digital signal processor(s)), software, and memory(ies) that work together to cause an apparatus, such as a mobile phone or server, to perform various functions described herein); and (c) to circuits, such as, for example, a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, other network device, and/or other computing device.

The term 'remote apparatus' as used herein may refer to any apparatus between a proxy cache server and an origin server, or the origin server itself. In this regard, the 'remote apparatus' may be any entity further downstream from a DASH client than the current entity to which the 'remote apparatus' is being compared.

The various DASH standards (e.g., 3GPP DASH, MPEG DASH, etc.) define the format of a media presentation. A media presentation may comprise a sequence of one or more consecutive periods; each period may comprise one or more groups; each group may comprise one or more adaptation sets; and each adaptation set may comprise one or more representations. A representation corresponds to one of one or more alternatives (or a subset of alternatives) of the media content, which typically differs from other representations by encoding choice (e.g., bitrate, resolution, language, codec, etc.). A representation may comprise one or more media components, such that each media component defines an encoded version of a particular media type (e.g., audio, video, timed text, etc.). Each media component of the representation may comprise one or more media segments, each of which may contain a particular duration of media data and/or metadata related to the media content of the media presentation. Each media segment may be referenced by a unique HTTP Uniform Resource Locator (URL) or Uniform Resource Identifier (URI), which in some instances may be restricted by a byte range. The various representations of a media presentation may be assigned to one or more adaptation sets, such that representations in the same adaptation set are alternatives to each other and may be automatically switched during download and playback of the media presentation based on a number of factors associated with the download and playback (e.g., available bandwidth, time of access, etc.).

Generally, a media presentation is represented and described by a Media Presentation Description (MPD), which may also be referred to as a playlist file, manifest file, or streaming manifest file. For example, the media presentation may be represented by an MPD defined as a well-formatted Extensible Markup Language (XML) document according to a particular XML schema. According to DASH standards, an MPD, as well as the associated media presentation, may be accessible according to various types of delivery methods. For example, the media presentation defined by the MPD may be accessible via unicast (e.g., via Packet-Switched Streaming (PSS) service), multicast (e.g., Multimedia Broadcast Multicast Services (MBMS)), and broadcast (e.g., via Digital Video Broadcasting-Handheld (DVB-H), MBMS, etc.) connections.

In a typical process, a DASH client may transmit an HTTP GET request for a segment of a representation to a first proxy cache server. In an instance in which the proxy cache server currently has the requested segment in its cache memory, the proxy cache server may return the requested segment to the DASH client. Otherwise, in an instance in which the proxy cache server does not have the segment in its cache memory, the proxy cache server may be configured to pass the request to the next entity in the request chain, for example, another proxy cache server or the origin server. This process may continue with the request traversing one or more hops between entities until one of the proxy cache servers has the requested segment in its cache or until the origin server is reached. In either case, the proxy cache server or origin server may return the requested segment to the DASH client via the same path over which the request traveled or, in some instances, over a different path.

DASH communications may be improved in some instances by a proxy cache server pre-fetching segments that are likely to be requested by a DASH client in the future. That is, a proxy cache server, such as the proxy cache server in direct communication with the DASH client (i.e., the first proxy cache server in the request chain from the DASH client), may proactively pre-fetch from entities (e.g., remote apparatuses) further down the request chain from the proxy cache server segments expected to be requested by the DASH client in the future. In doing so, the proxy cache server attempts to predict and pre-fetch the next segments to be requested by the DASH client in order to reduce response time for subsequent DASH client requests.

A proxy cache server may rely on, for example, a pre-fetching determination algorithm to decide which segments to pre-fetch and when. In these instances, the proxy cache server may need to maintain a state for each streaming session with a DASH client, where the state and/or the prevailing and/or expected network conditions and/or other factors may be used to make pre-fetching decisions. The state may include, for example, an estimated buffering status of the DASH client. In some cases, a pre-fetching determination algorithm may further perform rate adaptation calculations at the proxy cache server not only to adapt media bitrates to the varying bandwidth between a remote apparatus and the proxy cache server but also to adapt media bitrates to the varying bandwidth between the proxy cache server and the DASH client. The proxy cache server may also take into account the size of the cache memory, the amount of cache memory currently available, and/or the like when making pre-fetching decisions.

The pre-fetching methods described above suffer from numerous drawbacks when applied to DASH. For example, the proxy cache server must maintain the state of each streaming session, which when applied to the increasing number of DASH clients and their demands results in scalability issues, such as dramatically increasing the processing load, memory requirements, and/or memory access requirements of a proxy cache server.

Additionally, the pre-fetching determination algorithm may not have sufficient information to make accurate predictions on which segments to pre-fetch and when, which may result in inefficient bandwidth usage in delivering segments from a remote apparatus to the proxy cache server, unnecessary storage usage to cache segments of multiple or incorrect representations, and congestion control issues between a remote apparatus and a proxy cache server, among others. For example, a proxy cache server receiving a request for segments 1-5 of a first representation from a DASH client may decide to pre-fetch segments 6-10 of the first representation. In the interim, however, the DASH client may decide to switch to a different (i.e., second) representation. In this instance, the proxy cache server may have wasted resources pre-fetching the unnecessary portions of the first representation, and the DASH client may experience delays due to the 6-10 segments of the second representation not being pre-fetched.

The described pre-fetching methods may further suffer due to lack of communication between the DASH client and the proxy cache server. According to certain instances, the DASH client may be unaware of which segments of which representation are cached at the proxy server. In these instances, the DASH client may assume that the time elapsed from request to receipt of a segment, i.e., segment fetch time (SFT), is based on the network throughput rather than other factors such as whether the requested segments were cached by the proxy cache server. Furthermore, variation in SFT may result in a varying media time in the DASH client buffer. The DASH client may, therefore, decide to switch representations assuming a network throughput has changed when in fact the difference in SFT and client buffer time is due to some segments being cached and others not being cached.

For example, a DASH client may request segments 1-5 of a first representation, all of which happen to be cached at the proxy cache server, therefore resulting in a relatively fast SFT. Subsequently, the DASH client may request segments 6-10 of the first representation, none of which happen to be cached at the proxy cache server, therefore resulting in a relatively slow SFT. Even if the next segments (e.g., 11-20) of the first representation are cached at the proxy cache server, the DASH client may unknowingly decide to switch to a lower quality representation based on the slower SFT for segments 6-10. In some cases, the segments of the lower quality representation may not be cached by the proxy cache server, resulting in wasted resources by the proxy cache server from both caching the unused segments of the first representation and fetching the segments of the lower quality representation when the corresponding segments of the first representation could have been provided. The user experience at the DASH client may also be diminished due to receiving lower quality media representations as a result of the unnecessary switching.

Additionally, a DASH client may rely on its own rate adaptation algorithm to determine which representations and segments to request. Without signaling, the DASH client may not be able to determine the caching status at the proxy cache server. As a result, the DASH client may not be able to determine in advance whether subsequent requested segments will be fetched from a proxy cache server directly or from a remote apparatus, such as an origin server. Typically, an optimally designed rate adaptation algorithm should be able to identify when the variation in buffered media time and SFT are caused by varying end-to-end bandwidth or by the varying caching status for fetching different segments.

Furthermore, a well-designed rate adaptation algorithm at the DASH client may be designed to estimate the buffered media time changing trend for fetching subsequent segments based on the caching status of subsequent segments, the deliverable media bitrate estimation between a remote apparatus and a proxy cache server, the deliverable media bitrate estimation between a proxy cache server and a DASH client, and/or the like. Therefore, without a signaling method between a proxy cache server and a DASH client, the DASH client may not be able to provide accurate rate adaptation by increasing achievable media bitrate, reducing playback interruption frequency, and reducing the number of unnecessary switches of representation level.

Various embodiments of the present invention provide significant advantages over the pre-fetching methods described above. When a DASH client creates an HTTP GET request for segments, the request may further comprise one or more HTTP headers. Example embodiments of the present invention expand the HTTP headers to include a new header field named the Pre-Fetching-Segment header. The Pre-Fetching-Segment header, of various embodiments, allows a DASH client to request that a proxy cache server pre-fetch one or more segments of one or more representations in addition to retrieving the segments requested in the GET request. In some instances, the Pre-Fetching-Segment header may be included in a message separate from a GET request. In this regard, example embodiments advantageously allow the DASH client to assist the proxy cache server in determining which segments to pre-fetch and when. As a result, the proxy cache server may more efficiently utilize its storage capacity and resources while potentially saving bandwidth on retrieving segments unlikely to be requested by the DASH client. Moreover, the average spent time to fetch media segments at DASH clients is likely to be reduced in various embodiments, as it is more likely that a proxy cache server will have the requested segments cached. Consequently, DASH clients are likely to make fewer unnecessary switches of representation level due to late-arriving segments, and the DASH clients are also likely to face fewer interruptions in playback due to the same reason.

Some embodiments of the present invention may expand the HTTP headers to include a new header field named the Retrieve-Subsequent-Segments-Caching-Status header. This header may, in certain embodiments, permit a DASH client to direct a proxy cache server to provide feedback on the caching status of one or more segments of one or more representations likely to be requested by the DASH client in the near future. The Retrieve-Subsequent-Segments-Caching-Status header may further request additional information beyond the caching status of certain segments, such as the average bitrate to receive a segment to the proxy cache server (BR-R2P) from a remote apparatus, the time instant for starting to fetch at the proxy cache server (TSFP), the segment fetch time from a remote apparatus to the proxy cache server (SFT-R2P), the time from initiating a request from the proxy cache server to the time the first byte of the response is received from the originating server (latency-R2P), and/or the like.

Example embodiments of the present invention may expand the HTTP headers to include a new header field named the Proxy-Subsequent-Segments-Caching-Status header. This header may, in certain embodiments, permit a proxy cache server to respond to the Retrieve-Subsequent-Segments-Caching-Status header sent by a DASH client. Thus, the Proxy-Subsequent-Segments-Caching-Status header provide a signaling mechanism for providing feedback to the DASH client on the caching status (and/or additional related information) of one or more segments of one or more representations likely to be requested by the DASH client in the near future. As a result, various embodiments advantageously allow a DASH client to gain additional information on the status of segments likely to be requested in the future. Certain embodiments advantageously allow the DASH client to use the information received in a Proxy-Subsequent-Segments-Caching-Status header to supplement the information used in a rate adaptation algorithm and to further decide which segments to request be pre-fetched using a Pre-Fetching-Segment header.

Example embodiments advantageously allow the DASH client to drive pre-fetching decisions at the proxy cache server. As a result, the scalability issues related to a proxy cache server attempting to store state data related to the DASH clients may be reduced or avoided in some embodiments, thereby relieving some of the load on the proxy cache server. Furthermore, some embodiments allow a DASH client to gain information from a proxy cache server to distinguish differences in SFT based on varying end-to-end bandwidth or by the varying caching status for fetching different segments. Accordingly, in advantageous embodiments, a DASH client may avoid switching to lower or higher representations unnecessarily, and the DASH client may improve the user experience by using the information gathered during signaling via the new HTTP headers to better select the highest quality representation that the DASH system is capable of providing.

Figure 1:
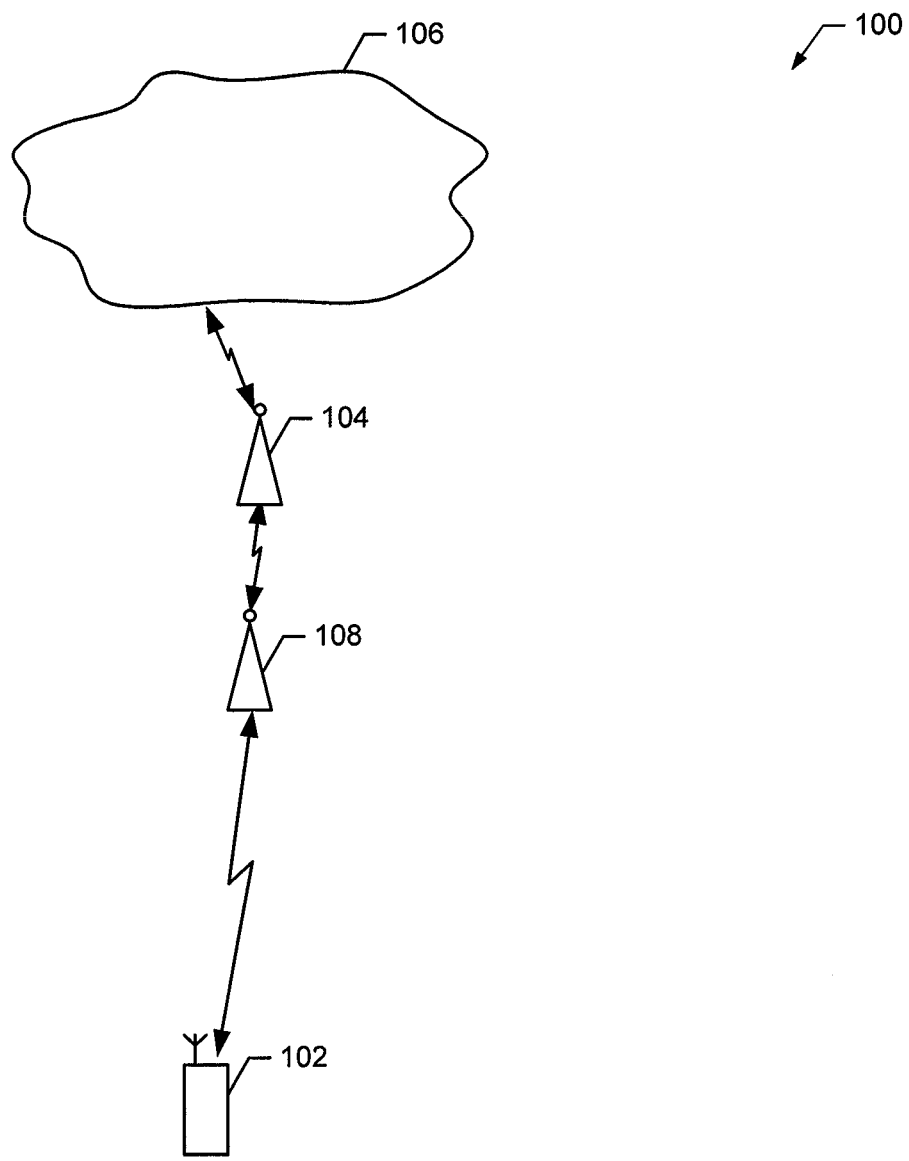
FIG. 1 illustrates a system for enabling efficient pre-fetching of media in a DASH system according to some example embodiments of the present invention.

Referring now to FIG. 1, FIG. 1 illustrates a block diagram of a system 100 for enabling efficient pre-fetching of media in a DASH system according to an example embodiment. It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of a system for enabling efficient pre-fetching of media in a DASH system, numerous other configurations may also be used to implement embodiments of the present invention.

The system 100 may include one or more terminal apparatuses 102 and one or more serving network apparatuses 104, 108. For example, as shown in FIG. 1, pone or more terminal apparatuses 102 may be configured to operate as a DASH client, one or more serving network apparatuses 104 may be configured to operate as an origin server, and/or one or more serving network apparatuses 108 may be configured to operate as a proxy server, such as a proxy cache server. In this regard, a DASH client requesting data may receive the data directly from the origin server, indirectly from the origin server via one or more proxy servers, or directly from a proxy server that has previously cached the requested data upon receiving it directly or indirectly (e.g., via one or more other proxy servers) from the origin server.

The system 100 may further comprise a network 106. The network 106 may comprise one or more wireline networks, one or more wireless networks, or some combination thereof. The network 106 may, for example, comprise a serving network (e.g., a serving cellular network) for one or more terminal apparatuses 102. The network 106 may comprise, in certain embodiments, one or more of the terminal apparatuses 102 and serving network apparatuses 104, 108 themselves. According to example embodiments, the network 106 may comprise the Internet. The network 106 may comprise, in some embodiments, a Content Delivery Network (CDN), which may also be referred to as a Content Distribution Network. In various embodiments, the network 106 may comprise a wired access link connecting one or more terminal apparatuses 102 to the rest of the network 106 using, for example, Digital Subscriber Line (DSL) technology. In some embodiments, the network 106 may comprise a public land mobile network (for example, a cellular network), such as may be implemented by a network operator (for example, a cellular access provider). The network 106 may operate in accordance with universal terrestrial radio access network (UTRAN) standards, evolved UTRAN (E-UTRAN) standards, current and future implementations of Third Generation Partnership Project (3GPP) LTE (also referred to as LTE-A) standards, current and future implementations of International Telecommunications Union (ITU) International Mobile Telecommunications-Advanced (IMT-A) systems standards, and/or the like. It will be appreciated, however, that where references herein are made to a network standard and/or terminology particular to a network standard, the references are provided merely by way of example and not by way of limitation.

In example embodiments, a terminal apparatus 102 may be embodied as any computing device, such as, for example, a desktop computer, laptop computer, mobile terminal, mobile computer, mobile phone, mobile communication device, tablet computing device, game device, digital camera/camcorder, audio/video player, television device, radio receiver, digital video recorder, positioning device, wrist watch, portable digital assistant (PDA), fixed transceiver device (e.g., attached to traffic lights, energy meters, light bulbs, and/or the like), a chipset, an apparatus comprising a chipset, any combination thereof, and/or the like.

According to various embodiments, one or more terminal apparatuses 102 may be configured to connect directly with one or more serving network apparatuses 104, 108 via, for example, an air interface without routing communications via one or more elements of the network 106. Alternatively, one or more of the terminal apparatuses 102 may be configured to communicate with one or more of the serving network apparatuses 104, 108 over the network 106. In this regard, the serving network apparatuses 104, 108 may comprise one or more nodes of the network 106. For example, in some example embodiments, the serving network apparatuses 104, 108 may be at least partially embodied on one or more computing devices that comprise an element of a radio access network (RAN) portion of the network 106. In this regard, the serving network apparatuses 104, 108 may, for example, be at least partially embodied on an access point of the network 106 (for example, a macrocell, microcell, picocell, femtocell, closed subscriber group (CSG) cell, base station, base transceiver station (BTS), node B, evolved node B, access point (AP), group owner, mesh station (STA), mesh point, and/or the like), which may, for example be configured to provide access to the network 106 (e.g., via a radio uplink) to one or more of the terminal apparatuses 102. In some embodiments, the serving network apparatuses 104, 108 may comprise an Access Network Discovery and Selection Function (ANDSF), and/or the like. Accordingly, each of the serving network apparatuses 104, 108 may comprise a network node or a plurality of network nodes collectively configured to perform one or more operations attributed to the serving network apparatus 104, 108 as described with respect to various example embodiments disclosed herein.

According to example embodiments, the system 100 may be configured according to an architecture for providing for distribution of media content. In this regard, the system 100 may be configured as an HTTP streaming system. For example, the system 100 may be configured to distribute one or more media presentations, as defined by a DASH standard such as 3GPP DASH or Moving Picture Experts Group (MPEG) DASH. In these embodiments, a DASH client (i.e., a terminal apparatus 102) may be configured to request one or more media segments of one or more media representations from an origin server and/or one or more proxy cache servers (i.e., one or more serving network apparatuses 104, 108) via the network 106.

Figure 2:
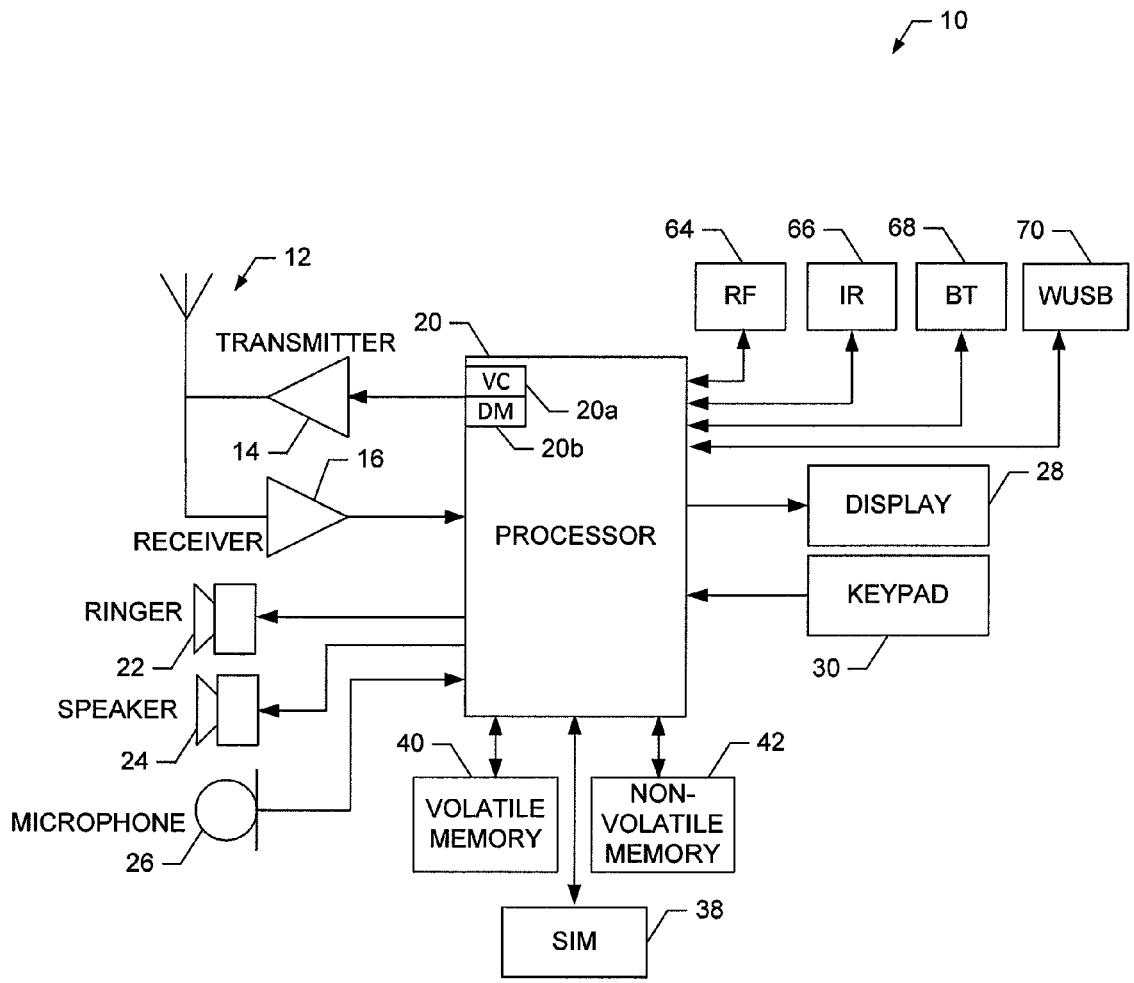
FIG. 2 illustrates a schematic block diagram of a mobile terminal according to some example embodiments of the present invention.

In some example embodiments, a terminal apparatus 102 may be embodied as a mobile terminal, such as that illustrated in FIG. 2. In this regard, FIG. 2 illustrates a block diagram of a mobile terminal 10 representative of one embodiment of a terminal apparatus 102. It should be understood, however, that the mobile terminal 10 illustrated and hereinafter described is merely illustrative of one type of computing device (i.e., terminal apparatus 102) that may implement and/or benefit from various embodiments and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some example embodiments the processor 20 may comprise a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Bluetooth™ (BT), Ultra-wideband (UWB), Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (for example, session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols such as LTE Advanced and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (for example, digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like.

Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (for example, software and/or firmware) stored on a memory accessible to the processor 20 (for example, volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to low power/energy or ultra-low power/energy Bluetooth™ technology (for example, Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The mobile terminal 10 may comprise memory, such as a removable or non-removable subscriber identity module (SIM) 38, a soft SIM 38, a fixed SIM 38, a removable or non-removable universal subscriber identity module (USIM) 38, a soft USIM 38, a fixed USIM 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (for example, hard disks, floppy disk drives, magnetic tape, etc.), optical disc drives and/or media, non-volatile random access memory (NVRAM), and/or the like. Like volatile memory 40 non-volatile memory 42 may comprise a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Figure 3:
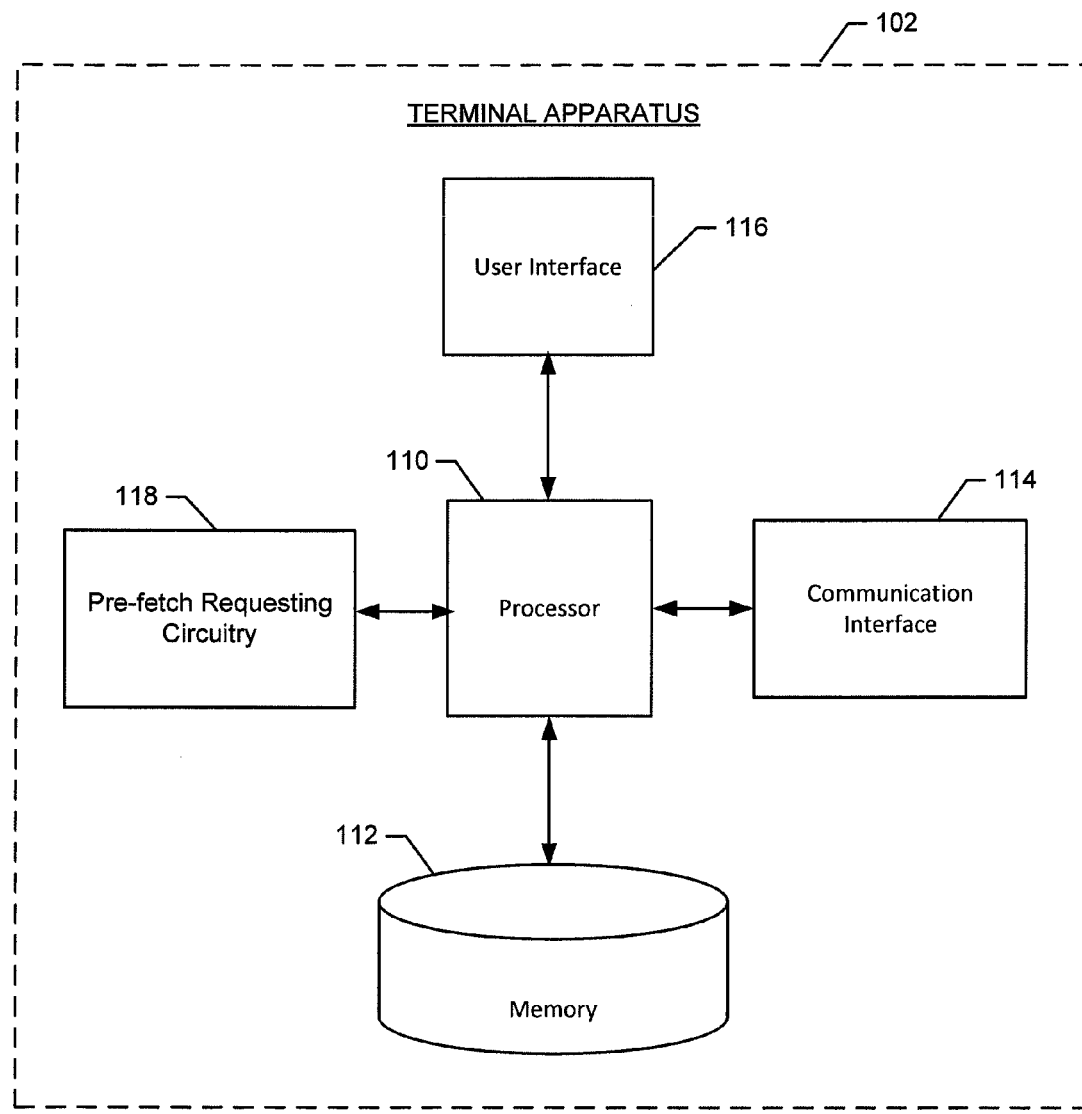
FIG. 3 illustrates a block diagram of a terminal apparatus according to some example embodiments of the present invention.

Referring now to FIG. 3, FIG. 3 illustrates a block diagram of a terminal apparatus 102 according to an example embodiment. In the example embodiment, the terminal apparatus 102 may comprise various means for performing the various functions herein described. These means may comprise one or more of a processor 110, memory 112, communication interface 114, user interface 116, or pre-fetch requesting circuitry 118. The means of the terminal apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (for example memory 112) that is executable by a suitably configured processing device (e.g., the processor 110), or some combination thereof.

In some example embodiments, one or more of the means illustrated in FIG. 3 may be embodied as a chip or chip set. In other words, the terminal apparatus 102 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 110, memory 112, communication interface 114, user interface 116, and/or pre-fetch requesting circuitry 118 may be embodied as a chip or chip set. The terminal apparatus 102 may therefore, in some example embodiments, be configured to implement embodiments of the present invention on a single chip or as a single "system on a chip." As another example, in some example embodiments, the terminal apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 3 as a single processor, in some embodiments the processor 110 may comprise a plurality of processors. The plurality of processors may be in operative communication with each other and may be collectively configured to perform one or more functionalities of the terminal apparatus 102 as described herein. The plurality of processors may be embodied on a single computing device or distributed across a plurality of computing devices collectively configured to function as the terminal apparatus 102. In embodiments wherein the terminal apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the terminal apparatus 102 to perform one or more of the functionalities of the terminal apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise one or more tangible and/or non-transitory computer-readable storage media that may include volatile and/or non-volatile memory. Although illustrated in FIG. 3 as a single memory, the memory 112 may comprise a plurality of memories. The plurality of memories may be embodied on a single computing device or may be distributed across a plurality of computing devices collectively configured to function as the terminal apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the terminal apparatus 102 is embodied as a mobile terminal 10, the memory 112 may comprise the volatile memory 40 and/or the non-volatile memory 42. The memory 112 may be configured to store information, data, applications, instructions, or the like for enabling the terminal apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the pre-fetch requesting circuitry 118 during the course of performing its functionalities.

The communication interface 114 may be embodied as any device or means embodied in circuitry, hardware, a computer program product comprising computer readable program instructions stored on a computer readable medium (for example, the memory 112) and executed by a processing device (for example, the processor 110), or a combination thereof that is configured to receive and/or transmit data from/to another computing device. In an example embodiment, the communication interface 114 may be at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the terminal apparatus 102 and one or more computing devices or computing resources may be in communication. As an example, the communication interface 114 may be configured to enable communication between the terminal apparatus 102 and another device, such as another terminal apparatus 102. As a further example, the communication interface 114 may be configured to enable communication with a serving network apparatus 104, 108 via the network 106. The communication interface 114 may additionally be in communication with the memory 112, user interface 116, and/or pre-fetch requesting circuitry 118, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, and/or pre-fetch requesting circuitry 118, such as via a bus.

The pre-fetch requesting circuitry 118 may be embodied as various means, such as circuitry, hardware, a computer program product comprising computer readable program instructions stored on a computer readable medium (for example, the memory 112) and executed by a processing device (for example, the processor 110), or some combination thereof and, in some embodiments, is embodied as or otherwise controlled by the processor 110. In embodiments wherein the pre-fetch requesting circuitry 118 is embodied separately from the processor 110, the pre-fetch requesting circuitry 118 may be in communication with the processor 110. The pre-fetch requesting circuitry 118 may further be in communication with one or more of the memory 112, communication interface 114, or user interface 116, such as via a bus.

Figure 4:
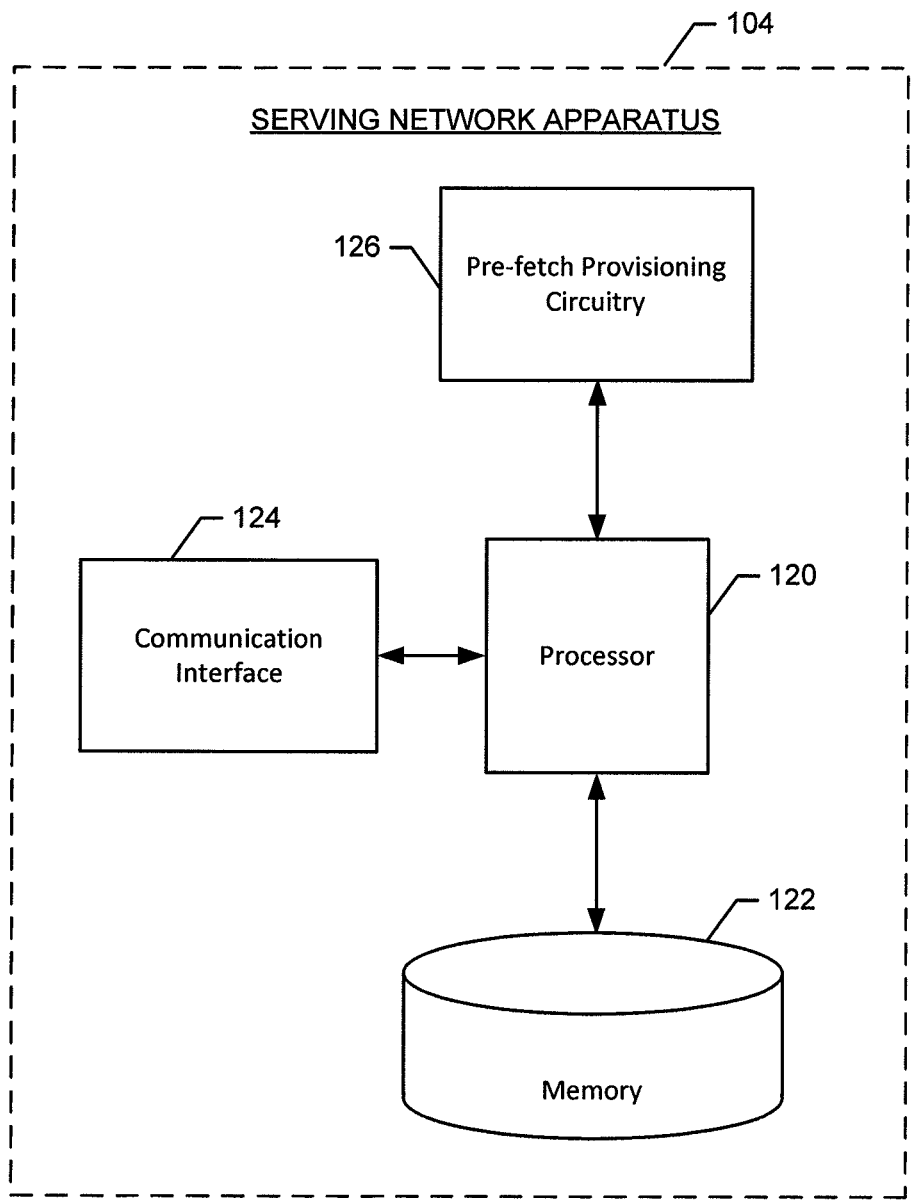
FIG. 4 illustrates a block diagram of a serving network apparatus according to some example embodiments of the present invention.

Referring now to FIG. 4, FIG. 4 illustrates a block diagram of a serving network apparatus 104, 108 according to an example embodiment. In the example embodiment, the serving network apparatus 104, 108 may comprise various means for performing the various functions herein described. These means may comprise one or more of a processor 120, memory 122, communication interface 124, or pre-fetch provisioning circuitry 126. The means of the serving network apparatus 104, 108 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 122) that is executable by a suitably configured processing device (e.g., the processor 120), or some combination thereof.

In some example embodiments, one or more of the means illustrated in FIG. 4 may be embodied as a chip or chip set. In other words, the serving network apparatus 104, 108 may comprise one or more physical packages (for example, chips) including materials, components and/or wires on a structural assembly (for example, a baseboard). The structural assembly may provide physical strength, conservation of size, and/or limitation of electrical interaction for component circuitry included thereon. In this regard, the processor 120, memory 122, communication interface 124, and/or pre-fetch provisioning circuitry 126 may be embodied as a chip or chip set. The serving network apparatus 104, 108 may therefore, in some example embodiments, be configured to implement embodiments of the present invention on a single chip or as a single "system on a chip." As another example, in some example embodiments, the serving network apparatus 104, 108 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), one or more other hardware processors, or some combination thereof. Accordingly, although illustrated in FIG. 4 as a single processor, in some embodiments the processor 120 may comprise a plurality of processors. The plurality of processors may be in operative communication with each other and may be collectively configured to perform one or more functionalities of the serving network apparatus 104, 108 as described herein. The plurality of processors may be embodied on a single computing device or distributed across a plurality of computing devices collectively configured to function as the serving network apparatus 104, 108. In some example embodiments, the processor 120 may be configured to execute instructions stored in the memory 122 or otherwise accessible to the processor 120. These instructions, when executed by the processor 120, may cause the serving network apparatus 104, 108 to perform one or more of the functionalities of the serving network apparatus 104, 108 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may comprise, for example, volatile memory, non-volatile memory, or some combination thereof. In this regard, the memory 122 may comprise a non-transitory computer-readable storage medium. Although illustrated in FIG. 4 as a single memory, the memory 122 may comprise a plurality of memories. The plurality of memories may be embodied on a single computing device or may be distributed across a plurality of computing devices collectively configured to function as the serving network apparatus 104, 108. In various example embodiments, the memory 122 may comprise a hard disk, random access memory, cache memory, flash memory, a compact disc read only memory (CD-ROM), digital versatile disc read only memory (DVD-ROM), an optical disc, circuitry configured to store information, or some combination thereof. The memory 122 may be configured to store information, data, applications, instructions, or the like for enabling the serving network apparatus 104, 108 to carry out various functions in accordance with various example embodiments. For example, in some example embodiments, the memory 122 may be configured to buffer input data for processing by the processor 120. Additionally or alternatively, the memory 122 may be configured to store program instructions for execution by the processor 120. The memory 122 may store information in the form of static and/or dynamic information. This stored information may be stored and/or used by the pre-fetch provisioning circuitry 126 during the course of performing its functionalities.

The communication interface 124 may be embodied as any device or means embodied in circuitry, hardware, a computer program product comprising computer readable program instructions stored on a computer readable medium (for example, the memory 122) and executed by a processing device (for example, the processor 120), or a combination thereof that is configured to receive and/or transmit data from/ to another computing device. In an example embodiment, the communication interface 124 may be at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more remote computing devices. The communication interface 124 may be configured to receive and/or transmit data using any protocol that may be used for communications between computing devices. In this regard, the communication interface 124 may be configured to receive and/or transmit data using any protocol that may be used for transmission of data over a wireless network, wireline network, some combination thereof, or the like by which the serving network apparatus 104, 108 and one or more computing devices or computing resources may be in communication. As an example, the communication interface 124 may be configured to enable communication with a terminal apparatus 102 by the network 106, a radio uplink, and/or the like. The communication interface 124 may additionally be in communication with the memory 122, and/or pre-fetch provisioning circuitry 126, such as via a bus.

The pre-fetch provisioning circuitry 126 may be embodied as various means, such as circuitry, hardware, a computer program product comprising computer readable program instructions stored on a computer readable medium (for example, the memory 122) and executed by a processing device (for example, the processor 120), or some combination thereof and, in some embodiments, is embodied as or otherwise controlled by the processor 120. In embodiments wherein the pre-fetch provisioning circuitry 126 may be embodied separately from the processor 120, the pre-fetch provisioning circuitry 126 may be in communication with the processor 120. The pre-fetch provisioning circuitry 126 may further be in communication with one or more of the memory 122 or communication interface 124, such as via a bus.

Various embodiments of the present invention propose methods for signaling from a terminal apparatus 102 (e.g., a DASH client) to a serving network apparatus 108 (e.g., a proxy cache server) to direct one or more serving network apparatuses 108 to pre-fetch one or multiple segments of a media presentation and to request that the serving network apparatus 108 give feedback about the caching status at one or more serving network apparatuses 108 of one or more segments. Additionally, example embodiments propose methods for signaling from a serving network apparatus 108 (e.g., a proxy cache server) to a terminal apparatus 102 (e.g., a DASH client) to provide feedback about the caching status of one or more segment(s) at one or more serving network apparatuses 108.

A. Example Pre-Fetching-Segment Header

The following example embodiment provides a method for signaling from a DASH client to a proxy cache server to direct the proxy cache server to pre-fetch one or more segments of one or more representations. According to this example embodiment, an HTTP header field named Pre-Fetching-Segment is defined to permit the permit the DASH client (i.e., terminal apparatus 102) to direct the proxy cache server (i.e. serving network apparatus 108) to pre-fetch segments of representations. In this regard, the proxy cache server may be configured to cache the pre-fetched segments in the cache (e.g., memory 122) of the proxy cache server without immediately sending the pre-fetched segments to the DASH client. In this example embodiment, the Pre-Fetching-Segment header field may contain sufficient information to allow the proxy cache server to create one or more HTTP GET requests upon receiving the Pre-Fetching-Segment header field, in an instance in which the proxy cache server is aware of the Pre-Fetching-Segment header field. The Pre-Fetching-Segment header field may be included in an HTTP Connection header field. As a result, the Pre-Fetching-Segment header field may only be received by the first proxy cache server from the DASH client (i.e., the proxy server cache receiving the request directly from the DASH client) in the request chain but not received by subsequent proxy cache servers in the request chain or an origin server.

FIGS. 10*a*-10*c* illustrate the definition of a Pre-Fetching-Segment header in Augmented Backus-Naar Form (ABNF) syntax according to an example embodiment of the invention. The component rules of the example Pre-Fetching-Segment header will be described in further detail below. It is to be understood that the this example embodiment is not to be limited to the specific definition disclosed and that modifications and other embodiments are intended to be included within the scope of the appended claims.

The Pre-Fetching-Segment header rule of this example embodiment may define one or more of the following rules: pre-fetch-representationid-segmentnumber-rangespec, pre-fetch-bandwidth-segmentnumber-rangespec, pre-fetch-representationid-segmenttime-rangespec, and pre-fetch-bandwidth-segmenttime-rangespec. In some embodiments, a Pre-Fetch-Segments-URI-Template may consist of placeholder identifiers such as $RepresentationID$, $Number$, $Bandwidth$, and $Time$. In this regard, pre-fetching segment URIs may be constructed by sequentially substituting $RepresentationID$, $Number$, $Bandwidth$, and $Time$ with representationid, segmentnumber, bandwidth, and segmenttime respectively, as specified in any of the four rangespec rules listed above.

According to this example embodiment, pre-fetch-representationid-segmentnumber-rangespec may consist of either a pre-fetch-representationid-segmentnumber-range or a pre-fetch-representationid-segmentnumber-list.

In a pre-fetch-representationid-segmentnumber-range, a list of one or more representationid"&"pre-fetch-segmentnumber-range elements may be specified. In this regard, the presented identifiers $RepresentationID$ in a Pre-Fetch-Segments-URI-Template may be sequentially substituted with the respective representationid of the specified list of representationid"&"pre-fetch-segmentnumber-range elements. Additionally, the presented identifiers $Number$ in the Pre-Fetch-Segments-URI-Template may be sequentially substituted with a respective range of segmentnumber elements as specified in the pre-fetch-segmentnumber-range for the corresponding representationid. The pre-fetch-segmentnumber-range may define a range from a first segmentnumber to a second segmentnumber.

In a pre-fetch-representationid-segmentnumber-list, a list of one or more representationid"&"segmentnumber elements may be specified. In this regard, the presented identifiers $RepresentationID$ and $Number$ in a Pre-Fetch-Segments-URI-Template may be sequentially substituted with the respective representationid and segmentnumber of the specified list of representationid"&"segmentnumber elements.

According to this example embodiment, pre-fetch-bandwidth-segmentnumber-rangespec may consist of either a pre-fetch-bandwidth-segmentnumber-range or a pre-fetch-bandwidth-segmentnumber-list.

In a pre-fetch-bandwidth-segmentnumber-range, a list of one or more bandwidth"&"pre-fetch-segmentnumber-range elements may be specified. In this regard, the presented identifiers $Bandwidth$ in a Pre-Fetch-Segments-URI-Template may be sequentially substituted with the respective bandwidth of the specified list of bandwidth"&"pre-fetch-segmentnumber-range elements. Additionally, the presented identifiers $Number$ in the Pre-Fetch-Segments-URI-Template may be sequentially substituted with a respective range of segmentnumber elements as specified in the pre-fetch-segmentnumber-range for the corresponding bandwidth.

In a pre-fetch-bandwidth-segmentnumber-list, a list of one or more bandwidth"&"segmentnumber elements may be specified. In this regard, the presented identifiers $Bandwidth$ and $Number$ in a Pre-Fetch-Segments-URI-Template may be sequentially substituted with the respective bandwidth and segmentnumber of the specified list of bandwidth"&"segmentnumber elements.

According to this example embodiment, pre-fetch-representationid-segmenttime-rangespec may consist of either a pre-fetch-representationid-segmenttime-range or a pre-fetch-representationid-segmenttime-list.

In a pre-fetch-representationid-segmenttime-range, a list of one or more representationid"&"pre-fetch-segmenttime-range elements may be specified. In this regard, the presented identifiers $RepresentationID$ in a Pre-Fetch-Segments-URI-Template may be sequentially substituted with the respective representationid of the specified list of representationid"&"pre-fetch-segmenttime-range elements. Additionally, the presented identifiers $Time$ in the Pre-Fetch-Segments-URI-Template may be sequentially substituted with a respective range of segmenttime elements as specified in the pre-fetch-segmenttime-range for the corresponding representationid. The pre-fetch-segmenttime-range may define a range from a first segmenttime to a second segmenttime.

In a pre-fetch-representationid-segmenttime-list, a list of one or more representationid"&"segmenttime elements may be specified. In this regard, the presented identifiers $RepresentationID$ and $Time$ in a Pre-Fetch-Segments-URI-Template may be sequentially substituted with the respective representationid and segmenttime of the specified list of representationid"&"segmenttime elements.

According to this example embodiment, pre-fetch-bandwidth-segmenttime-rangespec may consist of either a pre-fetch-bandwidth-segmenttime-range or a pre-fetch-bandwidth-segmenttime-list.

In a pre-fetch-bandwidth-segmenttime-range, a list of one or more bandwidth"&"pre-fetch-segmenttime-range elements may be specified. In this regard, the presented identifiers $Bandwidth$ in a Pre-Fetch-Segments-URI-Template may be sequentially substituted with the respective bandwidth of the specified list of bandwidth"&"pre-fetch-segmenttime-range elements. Additionally, the presented identifiers $Time$ in the Pre-Fetch-Segments-URI-Template may be sequentially substituted with a respective range of segmenttime elements as specified in the pre-fetch-segmenttime-range for the corresponding bandwidth.

In a pre-fetch-bandwidth-segmenttime-list, a list of one or more bandwidth"&"segmenttime elements may be specified. In this regard, the presented identifiers $Bandwidth$ and $Time$ in a Pre-Fetch-Segments-URI-Template may be sequentially substituted with the respective bandwidth and segmenttime of the specified list of bandwidth"&"segmenttime elements.

In this example, any of pre-fetch-representationid-segmentnumber-range, pre-fetch-representationid-segmentnumber-list, pre-fetch-representationid-segmenttime-range, pre-fetch-representationid-segmenttime-list, pre-fetch-bandwidth-segmentnumber-range, pre-fetch-bandwidth-segmentnumber-list, pre-fetch-bandwidth-segmenttime-range, and/or pre-fetch-bandwidth-segmenttime-list rules may further comprise the optional element accept-params. The accept-params may specify one or more qvalue and/or qvalue-range elements. In this regard, the accept-params may identify a single qvalue for the corresponding segment(s) of the rule and/or a range of qvalue elements from a first qvalue to a second qvalue for the corresponding range of segments of the rule. The qvalue specified in accept-params may specify the priority of the corresponding segments requested by the DASH client to be cached at the proxy cache server. For example, a proxy cache server may use qvalue to schedule pre-fetching segments in an instance in which multiple segments are required to be pre-fetched.

In some instances, a byte range may be included in a Pre-Fetching-Segment header field to restrict the constructed HTTP URL for the pre-fetched segment.

B. Example Retrieve-Subsequent-Segments-Caching-Status Header

The following example embodiment provides a method for signaling from a DASH client to a proxy cache server to direct feedback caching status of one or more segments of one or more representations, which may be requested by a proximate HTTP request from the DASH client. According to this example embodiment, an HTTP header field named Retrieve-Subsequent-Segments-Caching-Status is defined to permit the DASH client (i.e., terminal apparatus 102) to direct the proxy cache server (i.e. serving network apparatus 108) to feedback caching status of segments of representations likely to be requested by the DASH client in the near future. In this example, the proxy cache server may be configured to identify the status for each requested segment as one of the following: currently cached, currently being fetched, or neither cached nor being fetched. That is, currently cached identifies a segment already cached in the proxy cache server's cache memory; currently being fetched identifies a segment being fetched but not yet been fully received and, therefore, not yet cached in the proxy cache server's cache memory; and neither cached nor being fetched identifies a segment neither cached nor being fetched by the proxy cache server.

According to various embodiments, the caching status of segments likely to be requested in the future may be used by the DASH client to decide which segments to pre-fetch using the Pre-Fetching-Segment header. That is, the DASH client may be able to utilize the information received from the proxy cache server as a result of using the Retrieve-Subsequent-Segments-Caching-Status header to limit subsequent Pre-Fetching-Segment header requests to those segments that are neither cached nor being fetched by the proxy cache server. In some embodiments, the caching status of segments likely to be requested by the DASH client in the future may also be used in rate adaptation methods to reduce the frequency of playback interruption and the frequency of unnecessary representation level switching by a DASH client.

In this example embodiment, the Retrieve-Subsequent-Segments-Caching-Status header field may contain sufficient information to allow the proxy cache server to construct one or more URIs for one or more segments for which the DASH client has requested caching status. The Retrieve-Subsequent-Segments-Caching-Status header field may be included in an HTTP Connection header field. As a result, the Retrieve-Subsequent-Segments-Caching-Status header field may only be received by the first proxy cache server from the DASH client (i.e., the proxy server cache receiving the request directly from the DASH client) in the request chain but not received by subsequent proxy cache servers in the request chain or an origin server.

FIGS. 11a-11b illustrate the definition of a Retrieve-Subsequent-Segments-Caching-Status header in ABNF syntax according to an example embodiment of the invention. The component rules of the example Retrieve-Subsequent-Segments-Caching-Status header will be described in further detail below. It is to be understood that the this example embodiment is not to be limited to the specific definition disclosed and that modifications and other embodiments are intended to be included within the scope of the appended claims.

The Retrieve-Subsequent-Segments-Caching-Status header rule of this example embodiment may define one or more of the following rules: subsequent-representationid-segmentnumber-rangespec, subsequent-bandwidth-segmentnumber-rangespec, subsequent-representationid-segmenttime-rangespec, and subsequent-bandwidth-segmenttime-rangespec. In some embodiments, a Ret-Subsequent-Segments-URI-Template may consist of placeholder identifiers such as $RepresentationID$, $Number$, $Bandwidth$, and $Time$. In this regard, caching status segment URIs may be constructed by sequentially substituting $RepresentationID$, $Number$, $Bandwidth$, and $Time$ with representationid, segmentnumber, bandwidth, and segmenttime respectively, as specified in any of the four rangespec rules listed above.

According to this example embodiment, subsequent-representationid-segmentnumber-rangespec may consist of either a subsequent-representationid-segmentnumber-range or a subsequent-representationid-segmentnumber-list.

In a subsequent-representationid-segmentnumber-range, a list of one or more representationid"&"subsequent-segmentnumber-range elements may be specified. In this regard, the presented identifiers $RepresentationID$ in a Subsequent-Segments-URI-Template may be sequentially substituted with the respective representationid of the specified list of representationid"&"subsequent-segmentnumber-range elements. Additionally, the presented identifiers $Number$ in the Subsequent-Segments-URI-Template may be sequentially substituted with a respective range of segmentnumber elements as specified in the subsequent-segmentnumber-range for the corresponding representationid. The subsequent-segmentnumber-range may define a range from a first segmentnumber to a second segmentnumber.

In a subsequent-representationid-segmentnumber-list, a list of one or more representationid"&"segmentnumber elements may be specified. In this regard, the presented identifiers $RepresentationID$ and $Number$ in a Subsequent-Segments-URI-Template may be sequentially substituted with the respective representationid and segmentnumber of the specified list of representationid"&"segmentnumber elements.

According to this example embodiment, subsequent-bandwidth-segmentnumber-rangespec may consist of either a subsequent-bandwidth-segmentnumber-range or a subsequent-bandwidth-segmentnumber-list.

In a subsequent-bandwidth-segmentnumber-range, a list of one or more bandwidth"&"subsequent-segmentnumber-range elements may be specified. In this regard, the presented identifiers $Bandwidth$ in a Subsequent-Segments-URI-Template may be sequentially substituted with the respective bandwidth of the specified list of bandwidth"&"subsequent-segmentnumber-range elements. Additionally, the presented identifiers $Number$ in the Subsequent-Segments-URI-Template may be sequentially substituted with a respective range of segmentnumber elements as specified in the subsequent-segmentnumber-range for the corresponding bandwidth.

In a subsequent-bandwidth-segmentnumber-list, a list of one or more bandwidth"&"segmentnumber elements may be specified. In this regard, the presented identifiers $Bandwidth$ and $Number$ in a Subsequent-Segments-URI-Template may be sequentially substituted with the respective bandwidth and segmentnumber of the specified list of bandwidth"&"segmentnumber elements.

According to this example embodiment, subsequent-representationid-segmenttime-rangespec may consist of either a subsequent-representationid-segmenttime-range or a subsequent-representationid-segmenttime-list.

In a subsequent-representationid-segmenttime-range, a list of one or more representationid"&"subsequent-segmenttime-range elements may be specified. In this regard, the presented identifiers $RepresentationID$ in a Subsequent-Segments-URI-Template may be sequentially substituted with the respective representationid of the specified list of representationid"&"subsequent-segmenttime-range elements. Additionally, the presented identifiers $Time$ in the Subsequent-Segments-URI-Template may be sequentially substituted with a respective range of segmenttime elements as specified in the subsequent-segmenttime-range for the corresponding representationid. The subsequent-segmenttime-range may define a range from a first segmenttime to a second segmenttime.

In a subsequent-representationid-segmenttime-list, a list of one or more representationid"&"segmenttime elements may be specified. In this regard, the presented identifiers $RepresentationID$ and $Time$ in a Subsequent-Segments-URI-Template may be sequentially substituted with the respective representationid and segmenttime of the specified list of representationid"&"segmenttime elements.

According to this example embodiment, subsequent-bandwidth-segmenttime-rangespec may consist of either a subsequent-bandwidth-segmenttime-range or a subsequent-bandwidth-segmenttime-list.

In a subsequent-bandwidth-segmenttime-range, a list of one or more bandwidth"&"subsequent-segmenttime-range elements may be specified. In this regard, the presented identifiers $Bandwidth$ in a Subsequent-Segments-URI-Template may be sequentially substituted with the respective bandwidth of the specified list of bandwidth"&"subsequent-segmenttime-range elements. Additionally, the presented identifiers $Time$ in the Subsequent-Segments-URI-Template may be sequentially substituted with a respective range of segmenttime elements as specified in the subsequent-segmenttime-range for the corresponding bandwidth.

In a subsequent-bandwidth-segmenttime-list, a list of one or more bandwidth"&"segmenttime elements may be specified. In this regard, the presented identifiers $Bandwidth$ and $Time$ in a Subsequent-Segments-URI-Template may be sequentially substituted with the respective bandwidth and segmenttime of the specified list of bandwidth"&"segmenttime elements.

C. Example
Proxy-Subsequent-Segments-Caching-Status Header

The following example embodiment provides a method for signaling from a proxy cache server to a DASH client to inform the DASH client about the caching status of one or more segments of one or more representations, which may provide a response to a Retrieve-Subsequent-Segments-Caching-Status header field and/or may be used by a DASH client to create a Pre-Fetching-Segment header field by a DASH client. According to this example embodiment, an HTTP header field named Retrieve-Subsequent-Segments-Caching-Status is defined to permit the proxy cache server (i.e. serving network apparatus 108) to inform the DASH client (i.e., terminal apparatus 102) of the caching status of segments of representations likely to be requested by the DASH client in the near future. In this example, the proxy cache server may be configured to identify the status for each segment as one of the following: currently cached, currently being fetched, or neither cached nor being fetched. Additionally, to facilitate rate adaptation in the DASH client, the Proxy-Subsequent-Segments-Caching-Status header may also contain information related the reception bitrate for fetching a segment, the time instant of requesting a segment, the fetch latency to receive a first byte after requesting a segment, and/or the like. In various embodiments, the Proxy-Subsequent-Segments-Caching-Status header may contain sufficient information to respond to a Retrieve-Subsequent-Segments-Caching-Status message previously received from the DASH client. The Proxy-Subsequent-Segments-Caching-Status field may be categorized into a response header and created by a proxy cache server, but, in certain instances, not by an origin server.

FIGS. 12a-12b illustrates the definition of a Proxy-Subsequent-Segments-Caching-Status header in ABNF syntax according to an example embodiment of the invention. The component rules of the example Proxy-Subsequent-Segments-Caching-Status header will be described in further detail below. It is to be understood that the this example embodiment is not to be limited to the specific definition disclosed and that modifications and other embodiments are intended to be included within the scope of the appended claims.

The Proxy-Subsequent-Segments-Caching-Status header rule of this example embodiment may define a cachingstatus-subsequent-segments-listspec rule, which may subsequently define one or more of the following rules: cachingstatus-subsequent-representationid-segmentnumber-list, cachingstatus-subsequent-bandwidth-segmentnumber-list, cachingstatus-subsequent-representationid-segmenttime-list, and cachingstatus-subsequent-bandwidth-segmenttime-list. In some embodiments, a Proxy-Subsequent-Segments-URI-Template may consist of placeholder identifiers such as $RepresentationID$, $Number$, $Bandwidth$, and $Time$. In this regard, subsequent segment URIs may be constructed by sequentially substituting $RepresentationID$, $Number$, $Bandwidth$, and $Time$ with representationid, segmentnumber, bandwidth, and segmenttime respectively, as specified in any of the four list rules listed above.

In a cachingstatus-subsequent-representationid-segmentnumber-list, a list of one or more representationid"&"segmentnumber elements followed by a cachingstatus element may be specified. In this regard, the presented identifiers $RepresentationID$ in a Subsequent-Segments-URI-Template may be sequentially substituted with the respective representationid of the specified list of representationid"&"segmentnumber elements. Additionally, the presented identifiers $Number$ in the Subsequent-Segments-URI-Template may be sequentially substituted with the respective segmentnumber of the specified list of representationid"&"segmentnumber elements.

In a cachingstatus-subsequent-bandwidth-segmentnumber-list, a list of one or more bandwidth"&"segmentnumber elements followed by a cachingstatus element may be specified. In this regard, the presented identifiers $Bandwidth$ in a Subsequent-Segments-URI-Template may be sequentially substituted with the respective bandwidth of the specified list of bandwidth"&"segmentnumber elements. Additionally, the presented identifiers $Number$ in the Subsequent-Segments-URI-Template may be sequentially substituted with the respective segmentnumber of the specified list of bandwidth"&"segmentnumber elements.

In a cachingstatus-subsequent-representationid-segmenttime-list, a list of one or more representationid"&"segmenttime elements followed by a cachingstatus element may be specified. In this regard, the presented identifiers $RepresentationID$ in a Subsequent-Segments-URI-Template may be sequentially substituted with the respective representationid of the specified list of representationid"&"segmenttime elements. Additionally, the presented identifiers $Time$ in the Subsequent-Segments-URI-Template may be sequentially substituted with the respective segmenttime of the specified list of representationid"&"segmenttime elements.

In a cachingstatus-subsequent-bandwidth-segmenttime-list, a list of one or more bandwidth"&"segmenttime elements followed by a cachingstatus element may be specified. In this regard, the presented identifiers $Bandwidth$ in a Subsequent-Segments-URI-Template may be sequentially substituted with the respective bandwidth of the specified list of bandwidth"&"segmenttime elements. Additionally, the presented identifiers $Time$ in the Subsequent-Segments-URI-Template may be sequentially substituted with the respective segmenttime of the specified list of bandwidth"&"segmenttime elements.

In this example, the cachingstatus of any of cachingstatus-subsequent-representationid-segmentnumber-list, cachingstatus-subsequent-bandwidth-segmentnumber-list, cachingstatus-subsequent-representationid-segmenttime-list, and cachingstatus-subsequent-bandwidth-segmenttime-list may comprise an indication of the caching status of the corresponding segment of a representation in the list. For example, cachingstatus may equal one when the segment is already cached, two when the segment is being fetched, and three when the segment is neither cached nor being fetched.

In this example, any item of any of the lists defined by cachingstatus-subsequent-representationid-segmentnumber-list, cachingstatus-subsequent-bandwidth-segmentnumber-list, cachingstatus-subsequent-representationid-segmenttime-list, and cachingstatus-subsequent-bandwidth-segmenttime-list may comprise an optional corresponding rec-segment-bitrate-params element. The rec-segment-bitrate-params may comprise information related to reception bitrate related parameters and the time instant of requesting a segment. For example, the information may comprise one or more of the following: average bitrate to receive a segment to the proxy cache server (BR-R2P) from a remote apparatus for the cached segments, time instant for starting to fetch at proxy cache server (TSFP) for the cached segments and being fetched segments, spent time to fetch a segment from a remote apparatus to the proxy cache server (SFT-R2P), and the time from initiating a request from the proxy cache server to the time the first byte of the response is received from the originating server (latency-R2P).

After receiving a Proxy-Subsequent-Segments-Caching-Status, a DASH client may be configured to construct one or more URIs for subsequent segments as described above with respect to the Pre-Fetching-Segment header. For each URI, a caching status of the particular segment at the proxy cache server may be specified. As a result, the DASH client may be configured to identify caching statuses of one or more subsequent segments of one or more representations. In various embodiments, the DASH client may select the appropriate subsequent segments to be pre-fetched, namely those marked as neither cached nor being fetched, based at least in part on the received caching status of the segments.

D. Example Use Case of Headers

The following provides an example use case for providing signaling between a DASH client (i.e., a terminal apparatus 102) and a proxy cache server (i.e., a serving network apparatus 108) using the following headers: Pre-Fetching-Segment, Retrieve-Subsequent-Segments-Caching-Status, and Proxy-Subsequent-Segments-Caching-Status. It is to be understood that this is only an example use case and that modifications and other embodiments are intended to be included within the scope of the appended claims.

According to this example embodiment, a DASH client may create an HTTP GET request to be sent to a proxy cache server, such that the request comprises a Pre-Fetching-Segment and a Retrieve-Subsequent-Segments-Caching-Status header field, as follows:

```
GET http://example.com/contents/rep-3/seg-4.mp4 HTTP/1.1
Connection: Pre-Fetching-Segment, Retrieve-Subsequent-
```

-continued

```
Segments-Caching-Status
Pre-Fetching-Segment: http://example.com/contents/rep-
$representationID$/seg-$Number$.mp4;3&5-6; q=0.8-0.5
Retrieve-Subsequent-Segments-Caching-Status:
http://example.com/contents/rep-$representationID$/seg-
$Number$.mp4;3&5-10; 4&5-8; 2&5-8
```

In this example, the Pre-Fetching-Segment and Retrieve-Subsequent-Segments-Caching-Status headers are specified in a Connection header field. In this regard, the Connection header field may enable a DASH client to specify that the Pre-Fetching-Segment and Retrieve-Subsequent-Segments-Caching-Status option is desired for the connection between the DASH client and the first proxy cache server to receive the message, not the remaining proxy cache servers and/or origin server that may process the GET request. Once the GET request message is created, the DASH client may transmit the GET request to the proxy cache server.

According to this example, the proxy cache server may be configured to receive the GET request from the DASH client. Upon receiving the GET request, a proxy cache server may first process the GET request line, that is, GET http://example.com/contents/rep-3/seg-4.mp4 HTTP/1.1. In an instance in which the segment specified in the GET request line is cached by the proxy cache server, then the requested segment may be retrieved from the proxy cache server's cache memory and sent to the DASH client. Otherwise, in an instance in which the segment specified in the GET request line is not cached by the proxy cache server, the GET request line (i.e., http://example.com/contents/rep-3/seg-4.mp4 HTTP/1.1) may be forwarded to the next hop in the request chain, which may, in some embodiments, be another proxy cache server or an origin server. In this instance, because Pre-Fetching-Segment and Retrieve-Subsequent-Segments-Caching-Status are listed in the Connection header field, the proxy cache server may be configured not to forward the Pre-Fetching-Segment and Retrieve-Subsequent-Segments-Caching-Status header fields to the next hop in the request chain along with the GET request line. It should be understood that the detailed processing of the GET request is not described as conventional methods for processing the GET request by a proxy cache server may be used.

Subsequent to processing the GET request line, the proxy cache server may be configured to process the Pre-Fetching-Segment header field. In this regard, the proxy cache server may construct URIs for the segments for which pre-fetching has been requested in the Pre-Fetching-Segment header field by replacing the $RepresentationID$ and $Number$ placeholders in the header with the specified representationid and segmentnumber values as follows:

http://example.com/contents/rep-3/seg-5.mp4
http://example.com/contents/rep-3/seg-6.mp4

In the example embodiment, the proxy cache server may sequentially check the constructed URIs to determine whether they are cached at the proxy cache server. In an instance in which, for example, the proxy cache server contains or is already fetching a copy of the first pre-fetching resource (i.e., http://example.com/contents/rep-3/seg-5.mp4), the proxy cache server may be configured not to take any pre-fetching action with respect to the first resource. In an instance in which, for example, the proxy cache server does not contain and is not already fetching a copy of the second pre-fetching resource (i.e., http://example.com/contents/rep-3/seg-6.mp4), the proxy cache server may be configured to create an HTTP GET request for the resource (e.g., GET http://example.com/contents/rep-3/seg-6.mp4 HTTP/1.1

According to this example, the proxy cache server may be configured to forward the created HTTP GET request for the second resource to the next hop in the request chain, which may, in some embodiments, be another proxy cache server or an origin server. When forwarding the created HTTP GET request, the proxy cache server may remove the Pre-Fetching-Segment and Retrieve-Subsequent-Segments-Caching-Status header fields. In this way, only this first proxy cache server from the DASH client will process the Pre-Fetching-Segment and Retrieve-Subsequent-Segments-Caching-Status header fields rather than every proxy cache server connected between the DASH client and the origin server (or proxy cache server providing the segment) processing the headers.

The proxy cache server may subsequently receive a response to the HTTP GET request for the second resource comprising the requested segment(s). Once the response is received, the proxy cache server may be configured to cache the received pre-fetching segment(s). In this example, the proxy cache server does not forward the pre-fetched segment(s) to the DASH client, as the DASH client has thus far only requested that they be pre-fetched. In this regard, the proxy cache server may wait for a subsequent GET request from the DASH client for the pre-fetched segment(s) before providing the pre-fetched segment(s) to the DASH client.

The proxy cache may be configured to use the qvalue, or quality value, in the Pre-Fetch-Segment header to assign priorities to the various resources identified for pre-fetching in the Pre-Fetching-Segment header. Quality values typically range from 0 to 1 and represent the relative degradation in desired quality of a segment, but in some instances may further be used to indicate a level of priority in requesting the segment. In the above example, http://example.com/contents/rep-3/seg-5.mp4 is assigned the higher qvalue (i.e., 0.8), and http://example.com/contents/rep-3/seg-6.mp4 is assigned the lower qvalue (i.e., 0.5). In this regard, the qvalue may be used in scheduling the one or more pre-fetching resources according to the corresponding priority of the pre-fetching resource. As discussed above, however, in an instance in which the first resource is already cached by the proxy cached server, only the second resource may be pre-fetched.

Subsequent to processing the Pre-Fetching-Segment header, the proxy cache server may be configured to process the Retrieve-Subsequent-Segments-Caching-Status header field. In this regard, the proxy cache server may construct URIs for the segments for which the caching status for one or more subsequent segments has been requested in the Retrieve-Subsequent-Segments-Caching-Status header field by replacing the $RepresentationID$ and $Number$ placeholders in the header with the specified representationid and segmentnumber values as follows as follows:

URIs of subsequent segments of representation ID #3 include:
    http://example.com/contents/rep-3/seg-5.mp4
    http://example.com/contents/rep-3/seg-6.mp4
    http://example.com/contents/rep-3/seg-7.mp4
    http://example.com/contents/rep-3/seg-8.mp4
    http://example.com/contents/rep-3/seg-9.mp4
    http://example.com/contents/rep-3/seg-10.mp4

URIs of subsequent segments of representation ID #4 include:
    http://example.com/contents/rep-4/seg-5.mp4
    http://example.com/contents/rep-4/seg-6.mp4
    http://example.com/contents/rep-4/seg-7.mp4
    http://example.com/contents/rep-4/seg-8.mp4

URIs of subsequent segments of representation ID #2 include:
    http://example.com/contents/rep-2/seg-5.mp4
    http://example.com/contents/rep-2/seg-6.mp4
    http://example.com/contents/rep-2/seg-7.mp4
    http://example.com/contents/rep-2/seg-8.mp4

In the example embodiment, the proxy cache server may sequentially check the constructed URIs to determine whether they are cached at the proxy cache server or currently being fetched by the proxy cache server. In this example, it is assumed that for representation ID #3 segments 5 and 10 are already cached, segment 6 is being fetched, and segments 7-9 are neither cached nor being fetched; for representation ID #4 segment 6 is already cached and segments 5 and 7-8 are neither cached nor being fetched; and for representation ID #2 segments 5-8 are neither cached nor being fetched.

Once the status of the various segments identified in the Retrieve-Subsequent-Segments-Caching-Status header field are determined, the proxy cache server may be configured to generate a Proxy-Subsequent-Segments-Caching-Status header containing the various statuses and other relevant information to be sent to the DASH client. In this example, the Proxy-Subsequent-Segments-Caching-Status header may be included in the response to the original GET request, however, in some embodiments the header may be included in a message separate from the response to the GET request. In this example, the response may be generated as follows:

```
HTTP/1.1
DATE: Fri Oct 17 13:00:01 EST 2011
Server: Apache/2.0
Response-URI: http://example.com/contents/rep-3/seg-4.mp4
Proxy-Subsequent-Segments-Caching-Status:
http://example.com/contents/rep-$representationID$/seg-
$Number$.mp4;3&5; CS=1; TSFP=2011-10-17T12:50:42; BR-
R2P=258, 3&6; CS=2; TSFP=2011-10-17T12:54:42, 3&7; CS=3;
3&8; CS=3, 3&9; CS=3, 3&10; CS=1, TSFP=2011-10-
17T10:50:42; BR-R2P=450, 4&5; CS=3; 4&6; CS=1; TSFP=2011-
10-17T10:52:42; BR-R2P=550, 4&7; CS=3, 4&8; CS=3, 2&5;
CS=3, 2&6, CS=3, 2&7; CS=3, 2&8; CS=3
```

In the Proxy-Subsequent-Segments-Caching-Status header field, http://example.com/contents/rep-$representationID$/seg-$Number$.mp4; 3 &5; CS=1; TSFP=2011-10-17T12:50:42; BR-R2P=258 is parsed by the DASH client as follows. The $representationID$ and $Number$ are substituted by 3 and 5, respectively, to construct a URI as http://example.com/contents/rep-3/seg-5.mp4. For this URI, the caching status is equal to one, which indicates that the segment is already cached by the proxy cache server. This portion of the header further indicates that the TSFP value for this segment is equal to T12:50:42 on 2011-10-17 and the BR-R2P value for this segment is equal to 258. The remainder of the Proxy-Subsequent-Segments-Caching-Status header field may be parsed by the DASH client in a similar fashion.

E. Example Nested-Connection Header

According to various embodiments, the configuration of the network 106 may comprise more than one proxy cache server configured to handle an HTTP GET request by a DASH client prior to the request reaching an origin server, assuming the plurality of proxy cache servers do not currently have the requested segment cached. While various example embodiments relate to communications between the DASH client and the first proxy cache server in the request chain (i.e., the proxy cache server closest to and/or in direct contact with the DASH client), some embodiments may relate to communications between the DASH client and the proxy cache servers in the request chain other than the first proxy cache server (i.e., proxy cache servers between the first proxy cache server and the origin server). In certain embodiments, the Nested-Connection header may be used to facilitate communications.

FIG. 13 illustrates the definition of a Nested-Connection header in ABNF syntax according to an example embodiment of the invention. The component rules of the example Nested-Connection header will be described in further detail below. It is to be understood that the this example embodiment is not to be limited to the specific definition disclosed and that modifications and other embodiments are intended to be included within the scope of the appended claims.

The Nested-Connection header rule of this example embodiment may comprise one or more Nested-Connection-Counter elements. Each of the Nested-Connection-Counter elements may comprise a counter element. The counter element may be used to specify the n-th proxy cache server in request chain. For example, if the counter element for a Nested-Connection-Counter element specified by a DASH client equals three, the Nested-Connection-Counter element may be directed to the third proxy cache server from the DASH client in the request chain. Each Nested-Connection-Counter element may further comprise one or more Pre-Fetching-Segment, Retrieve-Subsequent-Segments-Caching-Status, and/or Proxy-Subsequent-Segments-Caching-Status header fields. In this regard, the Nested-Connection-Counter element may direct the one or more Pre-Fetching-Segment, Retrieve-Subsequent-Segments-Caching-Status, and/or Proxy-Subsequent-Segments-Caching-Status header fields to the proxy cache server specified by the counter element associated with the Nested-Connection-Counter element. For example, if the counter element of the Nested-Connection-Counter element equals three, the one or more Pre-Fetching-Segment, Retrieve-Subsequent-Segments-Caching-Status, and/or Proxy-Subsequent-Segments-Caching-Status header fields of the Nested-Connection-Counter element may be directed to the third proxy cache server from the DASH client in the request chain. In various embodiments, multiple Nested-Connection-Counter elements may be specified in the Nested-Connection header, each comprising a counter identifying the n-th proxy cache server in the request chain to which the one or more Pre-Fetching-Segment, Retrieve-Subsequent-Segments-Caching-Status, and/or Proxy-Subsequent-Segments-Caching-Status header fields associated with the particular Nested-Connection-Counter element are directed.

In operation, the Nested-Connection header may be processed by one or more proxy cache servers. In an instance in which the segment requested in the GET request associated with the Nested-Connection header is neither cached nor being fetched by the proxy cache server, the proxy cache server may process the Nested-Connection header field as follows. First, the proxy cache server may decrement the counter value associated with each of the Nested-Connection-Counter elements of the Nested-Connection header by one.

In an instance in which the counter value for one or more of the Nested-Connection-Counter elements reaches zero, the proxy cache server may remove the one or more Nested-Connection-Counter elements from the HTTP GET request message and process the associated Pre-Fetching-Segment header and/or Retrieve-Subsequent-Segments-Caching-Status headers as described further below. The proxy cache server may then generate a response to each of the associated Retrieve-Subsequent-Segments-Caching-Status headers, for example, in the form of a Proxy-Subsequent-Segments-Caching-Status header as described further below. In some embodiments, the proxy cache server may include the responses in a Nested-Connection header field in an HTTP response. In this regard, the counter field associated with the generated Nested-Connection-Counter elements in the Nested-Connection header may be initialized to 1. In other embodiments, in an instance in which the proxy cache server is local (i.e., located in the same device as the DASH client), the value of the counter fields may be initialized to 0.

Otherwise, in an instance in which the counter value for one or more of the Nested-Connection-Counter elements does not reach zero, the Nested-Connection header field along with the non-zero Nested-Connection-Counter elements may remain in the HTTP GET request, and the proxy cache server may be configured to transmit the HTTP GET request with headers to the next remote apparatus in the request chain.

In an instance in which the segment requested in the GET request associated with the Nested-Connection header is either cached or being fetched by the proxy cache server, the proxy cache server may process the Nested-Connection header field mostly as noted above. However, in an instance in which the counter value for one or more of the Nested-Connection-Counter elements does not reach zero, the Nested-Connection header field along with the non-zero Nested-Connection-Counter elements may be removed from the HTTP GET request. In this regard, the proxy cache server may be configured not to transmit the HTTP GET request with the Nested-Connection header to the next remote apparatus in the request chain.

In operation, a proxy cache processing a Nested-Connection header field in an HTTP response may operate as follows. First, the proxy cache server may increment the count value in each of the Nested-Connection-Count elements of the Nested-Connection header by one. Subsequently, the proxy cache server may be configured to transmit the HTTP response including the Nested-Connection header to the next proxy cache towards the DASH client or directly to the DASH client if the proxy cache server is the closest proxy cache server to the DASH client in the response chain.

The proposed Nested-Connection header field may facilitate a DASH client retrieving caching statuses of one or more subsequent segments at one or more proxy cache servers in a chain of proxy cache servers from an origin server to a DASH client and to order one or more proxy cache servers to pre-fetch one or more segments in one or more representations.

F. Example Embodiments Using Alternative Representations

Various embodiments of the present invention may benefit from the ability to accept one or more alternative segments in alternative representations in an instance in which the requested segment of the primary representation is not cached by the proxy cache server, as described in U.S. patent application Ser. No. 13/340,123 to Liu et al., which is incorporated by reference herein. Liu allows delivering more segments from the proxy cache server in order to reduce SFT for fetching segments from the DASH client and saving bandwidth used for delivering media data from the origin server to a proxy cache server by delivering sub-optimum bitrate encoded segments to the DASH client.

Some embodiments of the present invention may benefit from Liu by allowing for streaming to operate in two different modes. For example, in an instance in which the buffered media time becomes lower than a certain threshold and/or the buffer underflow count is larger than a certain threshold, the teachings of Liu may be used to fetch segments from the proxy cache server having a maximum possibility such that the buffered media time can be increased to a higher level and the possibility for buffer underflow can be reduced. In an instance in which the buffered media time is larger than a certain threshold and/or the buffer underflow count is lower than a certain threshold, the teachings of Liu will not be employed and the embodiments of the present invention will proceed as described herein.

G. Example Embodiments Using Local Proxy Cache

In various HTTP/TCP stack, web browser implementations, and/or the like, a local proxy cache server may be used. That is, the local proxy cache server may be located physically in the same device as the DASH client, however, the local proxy cache server may remain operationally distinct, thereby operating similarly to any other proxy cache server.

Various embodiments of the present invention may employ a local HTTP cache server located in the same device as the DASH client. In these embodiments, the local HTTP cache server may operate similarly to the proxy cache server described in various embodiments. In embodiment in which a local HTTP cache server cannot respond to an HTTP GET request, however, the local HTTP cache server may be configured to keep the Connection and Nested-Connection headers (if present) unresolved. That is, in certain embodiments, the local HTTP cache server may be configured not to remove the Pre-Fetching-Segment and Retrieve-Subsequent-Segments-Caching-Status header fields before passing the GET request to the next remote apparatus in the request chain.

H. Example Embodiments Using Sub-Segments

Various embodiments of the present invention may include URIs or URI templates in HTTP GET requests and/or responses, such that the URI or URI template may indicate a segment in a representation of an MPD. In these embodiments, a URI or URI template may alternatively or additionally specify a sub-segment, i.e., a part of a segment, for example a single byte range within a segment. A sub-segment may contain a portion of a segment that may be processed by a DASH client prior to receiving subsequent sub-segments of the same segment. A sub-segment may be determined, for example, during preparation of the media content and indicated through one or more Segment Index boxes included in the segment. In some instances, a DASH client may receive and parse one or more Segment Index boxes of a segment and determine one or more sub-segments as well as their corresponding URIs or URI templates. In these instances, a URI or URI template for a sub-segment may contain the URI or URI template, respectively, of the segment and a byte range part specifying the sub-segment.

According to example embodiments, in instances in which sub-representations have been specified in an MPD, a DASH client may be configured to request a resource in portions. Sub-representations may be embedded in regular representations and, in some instances, may be described by the Sub-Representation element in an MPD. The SubRepresentation element describes properties of one or more media content components that are embedded in the representation. For example, the SubRepresentation element may describe the properties of an embedded audio component (e.g., codec, sampling rate, etc.), an embedded sub-title (e.g., codec), an embedded lower quality video layer (e.g., lower frame rate, etc.), and/or the like.

Within a segment, data for a sub-representation may be ordered contiguously and sub-representations may be ordered hierarchically so that a sub-representation appearing earlier in a segment needs no information from sub-representation later in the segment. In some embodiments, a DASH client may decide to fetch a part of the sub-representations of a segment, in some instances, via a single HTTP GET request. In other embodiments, sub-representations may be ordered as described above within a sub-segment instead of a segment.

In order to support sub-segments and/or sub-representations, various embodiments of the present invention may modify the URI or URI template used in the Pre-Fetching-Segment header, Retrieve-Subsequent-Segments-Caching-Status header, and Proxy-Subsequent-Segments-Caching-Status header to comprise an element identifying the sub-segment and/or sub-representation. For example, a byte range value element may be included in the various URIs or URI templates. In other embodiments, the portion syntax element may comprise a list of portions that are pre-fetched. According to some embodiments, a proxy cache server may be configured to automatically fetch the remainder of a resource if only a portion of the resource has been fetched via an HTTP GET request or in response to a Pre-Fetching-Segment header.

I. Example Processes for Newly Defined Headers

Figure 5:
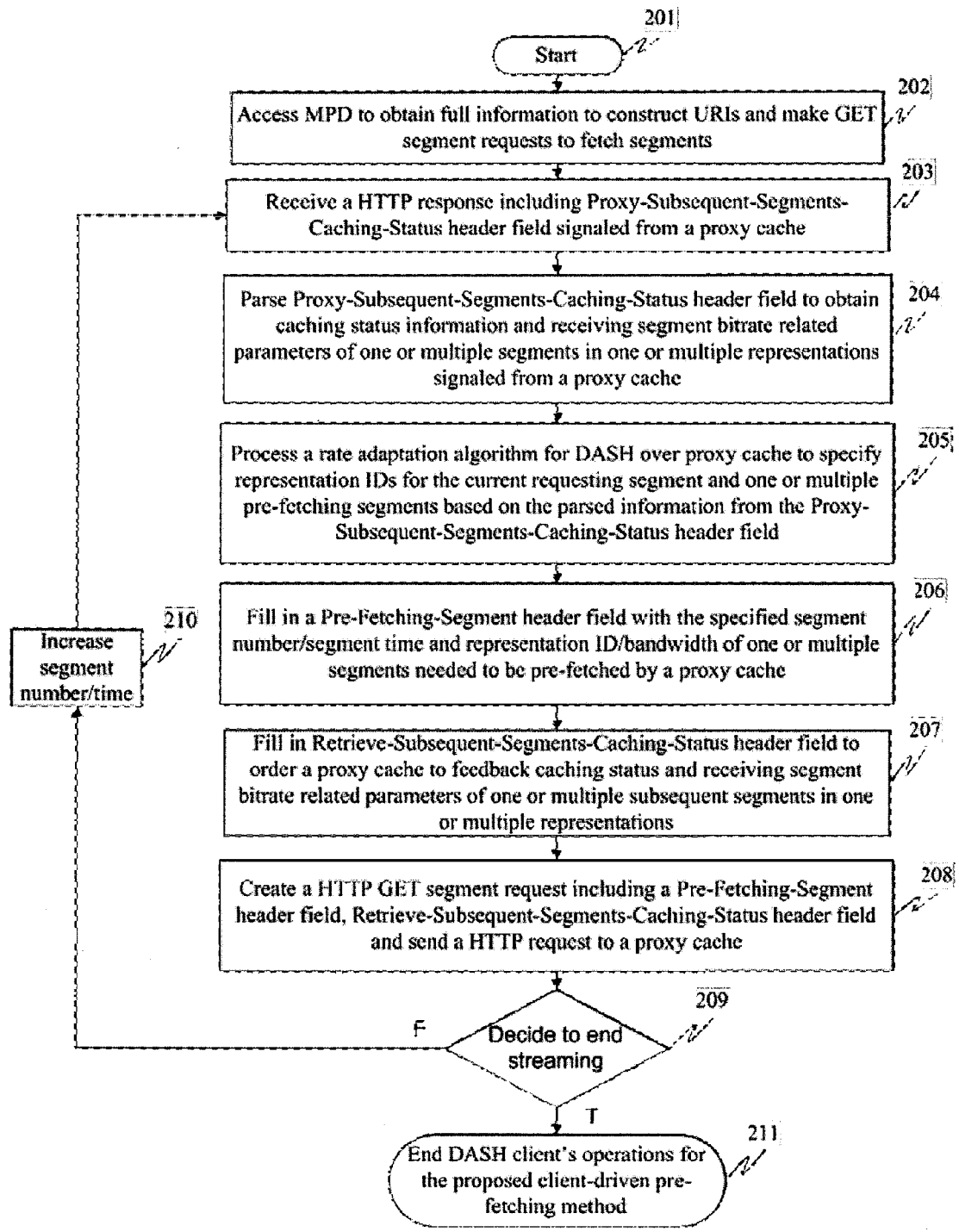
FIG. 5 illustrates a flowchart of operations performed by a DASH client according to an example method for enabling efficient pre-fetching of media in a DASH system according to some example embodiments of the present invention.

Referring now to FIG. 5, FIG. 5 illustrates a flowchart according to an example method for enabling efficient pre-fetching of media in a DASH system. In this regard, FIG. 5 illustrates operations that may be performed at a terminal apparatus 102 (e.g., a DASH client). It should be understood that in the following embodiments, any functionality described as being performed by the DASH client may be further interpreted as being performed by means, such as the processor 110, memory 112, communication interface 114, pre-fetch requesting circuitry 118, or the like, of a terminal apparatus 102 embodied as a DASH client.

At operation 202, the DASH client may be configured to access an MPD. In this regard, the DASH client may obtain information for constructing one or more URIs and one or more HTTP GET requests to fetch one or more segments of the MPD. At operation 203, the DASH client may receive an HTTP message including a Proxy-Subsequent-Segments-Caching-Status header field from a proxy cache server.

At operation 204, the DASH client may be configured to parse the Proxy-Subsequent-Segments-Caching-Status header field received from the proxy cache server. In this regard, the DASH client may obtain the caching status information and receiving segment bitrate related parameters indicated in the Proxy-Subsequent-Segments-Caching-Status header field of one or more segments of one or more representations. In some embodiments, the DASH client may parse the Proxy-Subsequent-Segments-Caching-Status header field to construct one or more URIs for segments to be subsequently requested. In this regard, the Proxy-Subsequent-Segments-Caching-Status header may comprise a caching status of the one or more subsequent segments at the proxy cache server. According to example embodiments, the DASH client may identify those subsequent segments having a caching status of neither cached nor being fetched for requesting subsequent pre-fetching. The Proxy-Subsequent-Segments-Caching-Status may additionally comprise, in certain embodiments, rec-segment-bitrate-params to signal the DASH client about additional information, such as reception bitrate related parameters comprising at least but not limited to BR-R2P, TSFP, SFT-R2P, response time for the segment, and/or the like.

At operation 205, the DASH client may be configured to process a rate adaptation algorithm for DASH. In this regard, the DASH client may be configured to use the algorithm to determine the representation IDs for the current segment to be requested and one or more segments to be pre-fetched based at least in part on the parsed information from the Proxy-Subsequent-Segments-Caching-Status header field. In some embodiments, the DASH client may use the parsed information from the Proxy-Subsequent-Segments-Caching-Status header field to estimate the deliverable media bitrate from a remote apparatus to a proxy cache server, and/or to estimate the deliverable media bitrate from a proxy cache server to a DASH client, which may be used in the rate adaptation algorithm of the DASH client.

At operation 206, the DASH client may generate a Pre-Fetching-Segment header field. The Pre-Fetching-Segment header field may comprise the segment number and/or segment time and representation ID and/or bandwidth of one or more segments to be pre-fetched by the proxy cache server. At operation 207, the DASH client may generate a Retrieve-Subsequent-Segments-Caching-Status header field. The Retrieve-Subsequent-Segments-Caching-Status header field may comprise a request for the proxy cache to feedback caching status and receiving segment bitrate related parameters of one or more segments of one or more representations to be subsequently requested by the DASH client. In example embodiments, the DASH client may specify in the Retrieve-Subsequent-Segments-Caching-Status header a range of segment numbers and/or segment times in one or more representation IDs. The range of segment numbers and/or segment times may be specified according to the requirement rate adaptation algorithm and pre-fetching method.

At operation 208, the DASH client may be configured to create an HTTP GET request. The HTTP GET request may comprise the GET request for the segment being requested, the Pre-Fetching-Segment header field, and the Retrieve-Subsequent-Segments-Caching-Status header field. The DASH client may be further configured to cause transmission of the HTTP GET request with headers to the proxy cache server. At operation 209, the DASH client may determine whether streaming has completed. In an instance in which the DASH client determines that streaming is not complete, the process may proceed to operation 210 where the DASH client may increase the segment number and/or time. Otherwise, in an instance in which the DASH client determines that streaming is complete, the DASH client may terminate the process.

Figure 6:
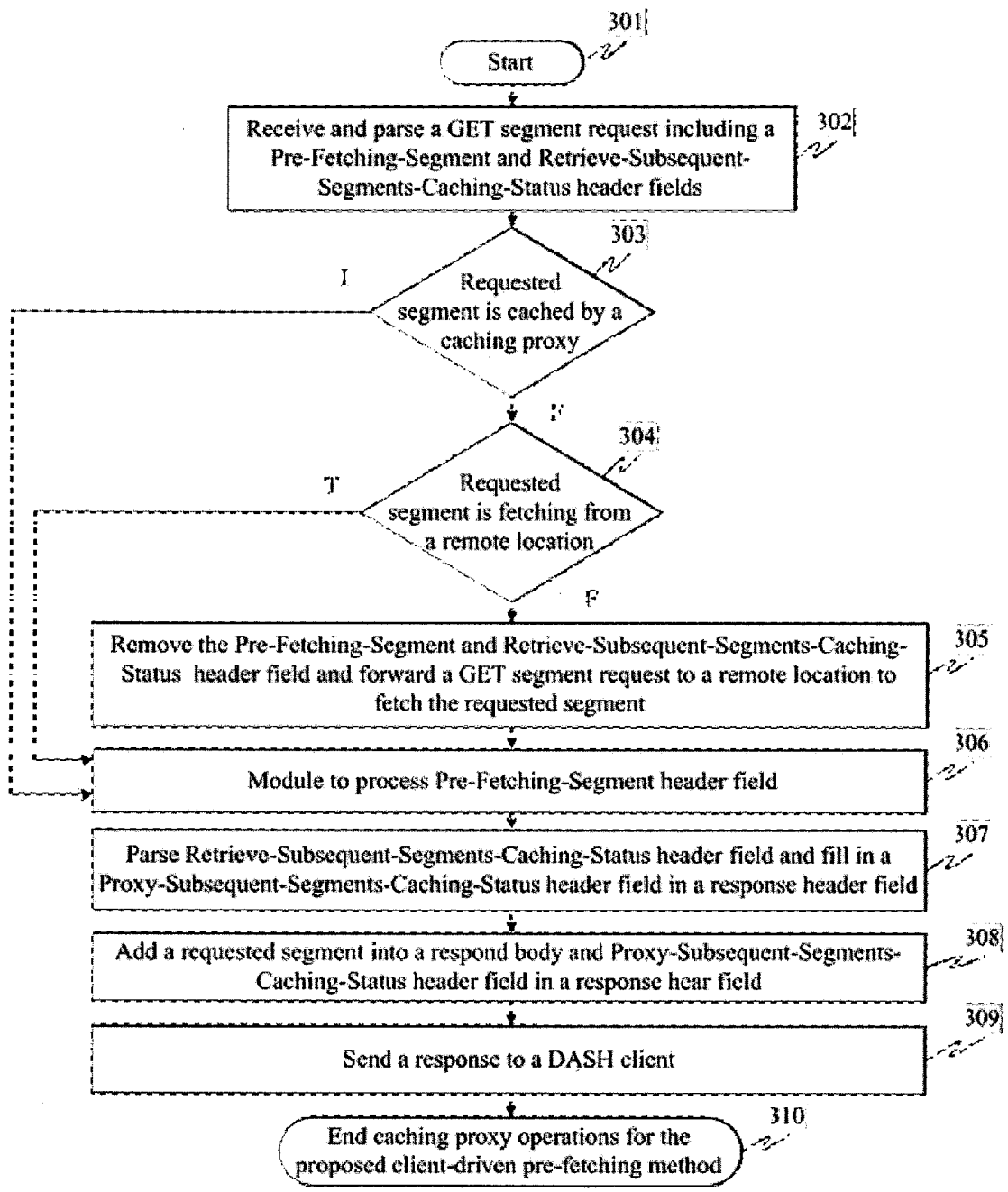
FIG. 6 illustrates a flowchart of operations performed by a proxy cache server according to an example method for enabling efficient pre-fetching of media in a DASH system according to some example embodiments of the present invention.

Referring now to FIG. 6, FIG. 6 illustrates a flowchart according to an example method for enabling efficient pre-fetching of media in a DASH system. In this regard, FIG. 6 illustrates operations that may be performed at a serving network apparatus 104, 108 (e.g., a proxy cache server). It should be understood that in the following embodiments, any functionality described as being performed by the proxy cache server may be further interpreted as being performed by means, such as the processor 120, memory 122, communication interface 124, pre-fetch provisioning circuitry 126, or the like, of a serving network apparatus 104, 108 embodied as a proxy cache server.

At operation 302, the proxy cache server may be configured to receive and parse an HTTP GET request from a DASH client. In various embodiments, the HTTP GET request may comprise a Pre-Fetching-Segment header field and a Retrieve-Subsequent-Segments-Caching-Status header field. At operation 303, the proxy cache server may be configured to determine whether the one or more segments in the HTTP GET request are currently cached by the proxy cache server. In an instance in which the one or more segments are not cached, the process may continue at operation 304, and in an instance in which the one or more segments are cached, the process may continue at operation 306. At operation 304, the proxy cache server may be configured to determine whether the one or more segments in the HTTP GET request are currently being fetched by the proxy cache server. In an instance in which the one or more segments are not being fetched, the process may continue at operation 305, and in an instance in which the one or more segments are being fetched, the process may continue at operation 306.

At operation 305, the proxy cache server may be configured to remove the Pre-Fetching-Segment header field and Retrieve-Subsequent-Segments-Caching-Status header field and forward the HTTP GET request to a remote apparatus. In this regard, the proxy cache server may be configured to pass the GET request further along the request chain to retrieve the requested segments. In these embodiments, the proxy cache server may be further configured to receive the requested segment from the remote apparatus and, in some instance, cache the segment prior to sending a response to the GET request.

At operation 306, the proxy cache server may be configured to process the Pre-Fetching-Segment header field. A flowchart describing example embodiments for processing the Pre-Fetching-Segment header field will be described below with respect to FIG. 7. At operation 307, the proxy cache server may be configured to parse the Retrieve-Subsequent-Segments-Caching-Status header field and generate a Proxy-Subsequent-Segments-Caching-Status header field. In this regard, the proxy cache server may cause transmission of the generated Proxy-Subsequent-Segments-Caching-Status header field to the DASH client in the response to the GET request. In other embodiments, the Proxy-Subsequent-Segments-Caching-Status header field may be included in a message separate from the GET response and sent to the DASH client.

At operation 308, the proxy cache server may generate a response to the GET request. In this regard, the response may comprise the segment requested in the GET request (which may have been cached by the proxy cache server or fetched from a remote apparatus) and/or the Proxy-Subsequent-Segments-Caching-Status header field. At operation 309, the proxy cache server may be configured to provide for transmission of the response to the DASH client. Once the response has been transmitted, the proxy cache server may be configured to end the process at operation 310.

Figure 7:
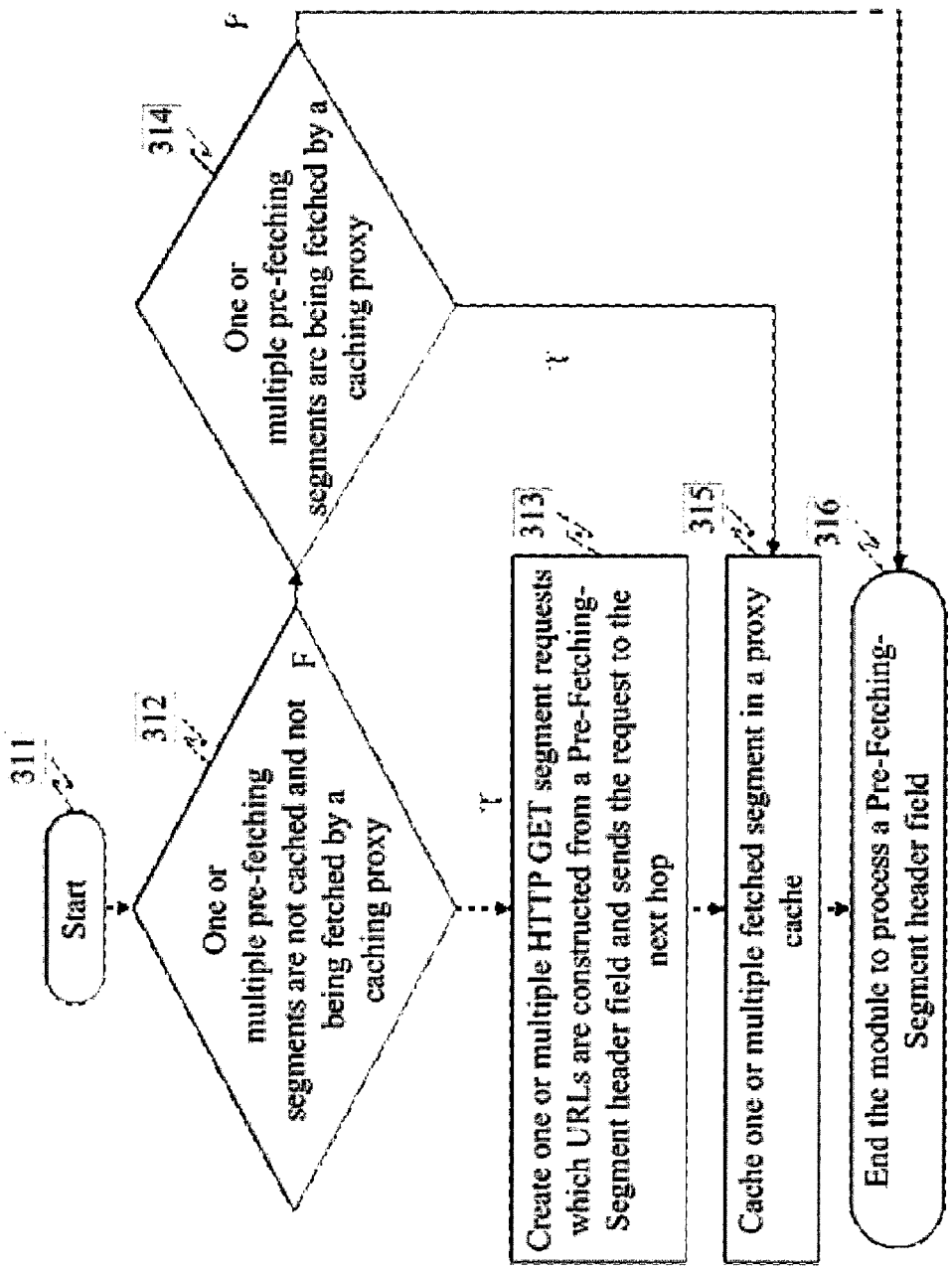
FIG. 7 illustrates a flowchart of operations performed by a proxy cache server according to an example method for processing a Pre-Fetching-Segment header field according to some example embodiments of the present invention.

Referring now to FIG. 7, FIG. 7 illustrates a flowchart according to an example method for processing a Pre-Fetching-Segment header field. In this regard, FIG. 7 illustrates operations that may be performed at a serving network apparatus 104, 108 (e.g., a proxy cache server). It should be understood that in the following embodiments, any functionality described as being performed by the proxy cache server may be further interpreted as being performed by means, such as the processor 120, memory 122, communication interface 124, pre-fetch provisioning circuitry 126, or the like, of a serving network apparatus 104, 108 embodied as a proxy cache server.

At operation 312, the proxy cache server may be configured to determine whether one or more segments identified in the Pre-Fetching-Segment header field are neither cached nor being fetched by the proxy cache server. In an instance in which one or more segments are neither cached nor being fetched, the process may continue at operation 313, otherwise the process may continue at operation 314. At operation 314, the proxy cache server may be configured to determine whether one or more segments identified in the Pre-Fetching-Segment header field are being fetched by the proxy cache server. In an instance in which one or more segments are being fetched, the process may continue at operation 315, otherwise the process may continue at operation 316.

At operation 313, the proxy cache server may be configured to generate one or more URIs for the segments identified as neither cached nor being fetched and to create an HTTP GET request for each of the URIs. The proxy cache server may then be configured to provide for transmission of the one or more HTTP GET requests to one or more remote apparatuses to retrieve the segments. In this regard, the proxy cache server may be configured to operate as a user agent performing similar functionality to the DASH client for retrieving the un-cached segments.

At operation 315, the proxy cache server may be configured to receive the one or more segments in response to the one or more GET requests or from earlier GET requests. The proxy cache server may be further configured to cache the one or more pre-fetched segments. In these embodiments, the proxy cache server may be configured not to send the pre-fetched segments to the DASH client until the proxy cache server receives a further GET request for the particular segments. Once the segments have been pre-fetched and cached, the proxy cache server may be configured to end the process at operation 316.

Referring now to FIGS. 8a-8b, FIGS. 8a-8b illustrate a flowchart according to an example method for enabling efficient pre-fetching of media in a DASH system. In this regard, FIGS. 8a-8b illustrate operations that may be performed at a terminal apparatus 102 (e.g., a DASH client). It should be understood that in the following embodiments, any functionality described as being performed by the DASH client may be further interpreted as being performed by means, such as the processor 110, memory 112, communication interface 114, pre-fetch requesting circuitry 118, or the like, of a terminal apparatus 102 embodied as a DASH client.

At operation 502, the DASH client may be configured to access an MPD. In this regard, the DASH client may obtain information for constructing one or more URIs and one or more HTTP GET requests to fetch one or more segments of the MPD. At operation 503, the DASH client may receive an HTTP message including a Nested-Connection header field comprising one or more Nested-Connection-Count elements each comprising a Proxy-Subsequent-Segments-Caching-Status header field from a proxy cache server.

At operation 504, the DASH client may be configured to parse the Nested-Connection header field to access the one or more Proxy-Subsequent-Segments-Caching-Status header fields contained in the one or more Nested-Connection-Count elements. The DASH client may be further configured to parse the one or more Proxy-Subsequent-Segments-Caching-Status header fields. In this regard, the DASH client may obtain the caching status information and receiving segment bitrate related parameters indicated in each of the Proxy-Subsequent-Segments-Caching-Status header fields of one or more segments of one or more representations at one or more proxy cache servers identified by the respective counter value associated with the containing Nested-Connection-Counter element.

At operation 505, the DASH client may be configured to process a rate adaptation algorithm for DASH. In this regard, the DASH client may be configured to use the algorithm to determine the representation IDs for the current segment to be requested and one or more segments to be pre-fetched and the one or more proxy cache servers from which to request them based at least in part on the parsed information from the one or more Proxy-Subsequent-Segments-Caching-Status header fields. In some embodiments, the DASH client may use the parsed information from the one or more Proxy-Subsequent-Segments-Caching-Status header field to estimate the deliverable media bitrate from a remote apparatus to one of the one or more proxy cache servers, to estimate the deliverable media bitrate from one of the one or more proxy cache servers to another one of the one or more proxy cache servers, and/or to estimate the deliverable media bitrate from one of the one or more proxy cache servers to the DASH client, which may be used in the rate adaptation algorithm of the DASH client. In some embodiments, the DASH client may accurately estimate the deliverable media bitrate from a remote apparatus to one or more proxy cache servers, respectively, in a chain of proxy cache servers between the origin server and the DASH client, and estimate the deliverable media bitrate from one or more proxy cache servers in the chain to the DASH client, respectively.

At operation 506, the DASH client may generate one or more Pre-Fetching-Segment header fields each directed at one of the one or more proxy cache servers. The DASH client may further generate a Nested-Connection header comprising one or more Nested-Connection-Counter elements. In this regard, the DASH client may include a corresponding Pre-Fetching-Segment in each or a subset of the one or more Nested-Connection-Counter elements based on the counter value associated with the Nested-Connection-Counter element and the proxy cache server to which the Pre-Fetching-Segment header field is directed. At operation 507, the DASH client may generate one or more Retrieve-Subsequent-Segments-Caching-Status header fields each directed at one of the one or more proxy cache servers. The DASH client may further include a corresponding Retrieve-Subsequent-Segments-Caching-Status in each or a subset of the one or more Nested-Connection-Counter elements based on the counter value associated with the Nested-Connection-Counter element and the proxy cache server to which the Retrieve-Subsequent-Segments-Caching-Status header field is directed.

At operation 508, the DASH client may be configured to create an HTTP GET request. The HTTP GET request may comprise the GET request for the segment being requested and the Nested-Connection header, which may comprise one or more Nested-Connection-Count elements each comprising one or more of the Pre-Fetching-Segment header fields and/or one or more of the Retrieve-Subsequent-Segments-Caching-Status header fields. The DASH client may be further configured to cause transmission of the HTTP GET request with headers to the first proxy cache server in the request chain. At operation 509, the DASH client may determine whether streaming has completed. In an instance in which the DASH client determines that streaming is not complete, the process may proceed to operation 510 where the DASH client may increase the segment number and/or time. Otherwise, in an instance in which the DASH client determines that streaming is complete, the DASH client may terminate the process at operation 511.

FIG. 9 illustrates a flowchart according to an example method for enabling efficient pre-fetching of media in a DASH system. In this regard, FIG. 9 illustrates operations that may be performed at a terminal apparatus 102 (e.g., a DASH client). The operations illustrated in and described with respect to FIG. 9 may, for example, be performed by, with the assistance of, and/or under the control of one or more of the processor 110, memory 112, communication interface 114, or pre-fetch requesting circuitry 118. Operation 900 may comprise accessing, via a processor, information related to a media presentation description (MPD). The information comprising information related to one or more segments of the MPD. The processor 110, memory 112, communication interface 114, user interface 116, and/or pre-fetch requesting circuitry 118 may, for example, provide means for performing operation 900. Operation 910 may comprise generating a request for a segment of the MPD. The processor 110, memory 112, communication interface 114, user interface 116, and/or pre-fetch requesting circuitry 118 may, for example, provide means for performing operation 910. Operation 920 may comprise generating a request for pre-fetching one or more segments different from the requested segment. The processor 110, memory 112, communication interface 114, user interface 116, and/or pre-fetch requesting circuitry 118 may, for example, provide means for performing operation 920. Operation 930 may comprise providing for transmission of the request for the segment and the request for pre-fetching the one or more different segments to a proxy cache server. The processor 110, memory 112, communication interface 114, user interface 116, and/or pre-fetch requesting circuitry 118 may, for example, provide means for performing operation 930.

FIG. 9 illustrates flowcharts of a system, method, and computer program product according to example embodiments of the invention. It will be understood that each block of the flowchart, and combinations of blocks in the flowchart, may be implemented by various means, such as hardware and/or a computer program product comprising one or more computer-readable mediums (as opposed to a computer-readable transmission medium which describes a propagating signal) having one or more computer program code instructions, program instructions, or executable computer-readable program code instructions stored therein. For example, one or more of the procedures described herein may be embodied by computer program instructions of a computer program product. In this regard, the computer program product(s) that embodies the procedures described herein may be stored by one or more memory devices (e.g., memory 122, volatile memory 40, or non-volatile memory 42) of a mobile terminal, server, or other computing device (e.g., the terminal apparatus 102) and executed by a processor (e.g., the processor 120 or processor 20) in the computing device. In some embodiments, the computer program instructions comprising the computer program product(s) that embodies the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s).

Further, the computer program product may comprise one or more computer-readable memories on which the computer program instructions may be stored such that the one or more computer-readable memories can direct a computer or other programmable apparatus to function in a particular manner, such that the computer program product may comprise an article of manufacture which implements the function specified in the flowchart block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together.

Accordingly, execution of instructions associated with the operations of the flowchart by a processor, or storage of instructions associated with the blocks or operations of the flowchart in a computer-readable storage medium, support combinations of operations for performing the specified functions. It will also be understood that one or more operations of the flowchart, and combinations of blocks or operations in the flowchart, may be implemented by special purpose hardware-based computer systems and/or processors which perform the specified functions, or combinations of special purpose hardware and program code instructions.

The above described functions may be carried out in many ways. For example, any suitable means for carrying out each of the functions described above may be employed to carry out embodiments of the invention. In example embodiments, a suitably configured processor (for example, the processor 110 and/or processor 120) may provide all or a portion of the elements of the invention. In other embodiments, all or a portion of the elements of the invention may be configured by and operate under control of a computer program product. The computer program product for performing the methods of embodiments of the invention may comprise a computer-readable storage medium, such as the non-volatile storage medium (for example, the memory 112 and/or memory 122), and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   accessing, via a processor, information related to a media presentation description (MPD), wherein the information comprises information related to one or more segments of the MPD;
   causing generation, by the processor, of a request for a segment of the MPD in which the segment is based at least in part on a caching status associated with the segment of the MPD and one or more bitrate related parameters of one or more subsequent segments in one or more representations, wherein causing generation of the request for the segment of the MPD comprises: causing execution of a rate adaptation algorithm using the caching status and the one or more bitrate related parameters and causing selection of the segment based at least in part on the results of executing the rate adaptation algorithm;

causing generation, by the processor, of a request for pre-fetching one or more segments different from the requested segment; and providing for transmission of the request for the segment and the request for pre-fetching the one or more different segments to a proxy cache server.

2. The method of claim 1, further comprising:
causing generation of a request for the caching status associated with at least one segment of the MPD;
providing for transmission of the request for the caching status to the proxy cache server; and
receiving the caching status associated with the at least one segments.

3. The method of claim 2, wherein causing generation of the request for a segment of the MPD further comprises causing selection of the segment based at least in part on the received caching status.

4. The method of claim 2, wherein causing generation of the request for pre-fetching the one or more different segments further comprises causing selection of the one or more different segments based at least in part on the received caching status.

5. The method of claim 4, wherein causing selection of the one or more different segments based at least in part on the received caching status further comprises:
causing execution of a rate adaptation algorithm using the received caching status; and
causing selection of the one or more different segments based at least in part on the results of executing the rate adaptation algorithm.

6. The method of claim 2, wherein providing for transmission of the request for pre-fetching the one or more different segments to the proxy cache server further comprises providing for transmission of the request for pre-fetching the one or more different segments to a particular proxy cache server identified by a count identifier in the request for pre-fetching, and wherein providing for transmission of the request for the caching status to the proxy cache server further comprises providing for transmission of the request for the caching status to a particular proxy cache server identified by a count identifier in the request for caching status.

7. An apparatus comprising:
at least one processor; and
at least one memory comprising computer program code, the at least one memory and the computer program code configured to, with the at least one processor, cause the apparatus at least to:
access information related to a media presentation description (MPD), wherein the information comprises information related to one or more segments of the MPD;
generate a request for a segment of the MPD in which the segment is based at least in part on a caching status associated with the segment of the MPD and one or more bitrate related parameters of one or more subsequent segments in one or more representations, wherein generation of the request for the segment of the MPD comprises: causing execution of a rate adaptation algorithm using the caching status and the one or more bitrate related parameters and causing selection of the segment based at least in part on the results of executing the rate adaptation algorithm;
generate a request for pre-fetching one or more segments different from the requested segment; and
provide for transmission of the request for the segment and the request for pre-fetching the one or more different segments to a proxy cache server.

8. The apparatus of claim 7, wherein the at least one memory and the computer program code are further configured to, with the at least one processor, cause the apparatus to:
generate a request for the caching status associated with at least one segment of the MPD;
provide for transmission of the request for the caching status to the proxy cache server; and
receive the caching status associated with the at least one segments.

9. The apparatus of claim 8, wherein in order to generate the request for a segment of the MPD, the at least one memory and the computer program code are further configured to, with the at least one processor, cause the apparatus to select the segment based at least in part on the received caching status.

10. The apparatus of claim 8, wherein in order to generate the request for pre-fetching the one or more different segments, the at least one memory and the computer program code are further configured to, with the at least one processor, cause the apparatus to select the one or more different segments based at least in part on the received caching status.

11. The apparatus of claim 10, wherein in order to the one or more different segments based at least in part on the received caching status, the at least one memory and the computer program code are further configured to, with the at least one processor, cause the apparatus to:
execute a rate adaptation algorithm using the received caching status; and
select the one or more different segments based at least in part on the results of executing the rate adaptation algorithm.

12. The apparatus of claim 8,
wherein in order to provide for transmission of the request for pre-fetching the one or more different segments to the proxy cache server, the at least one memory and the computer program code are further configured to, with the at least one processor, cause the apparatus to provide for transmission of the request for pre-fetching the one or more different segments to a particular proxy cache server identified by a count identifier in the request for pre-fetching, and
wherein in order to provide for transmission of the request for the caching status to the proxy cache server, the at least one memory and the computer program code are further configured to, with the at least one processor, cause the apparatus to provide for transmission of the request for the caching status to a particular proxy cache server identified by a count identifier in the request for caching status.

13. A computer program product comprising at least one non-transitory computer readable medium having program code stored thereon, wherein the program code, when executed by an apparatus, causes the apparatus at least to:
access information related to a media presentation description (MPD), wherein the information comprises information related to one or more segments of the MPD;
generate a request for a segment of the MPD in which the segment is based at least in part on a caching status associated with the segment of the MPD and one or more bitrate related parameters of one or more subsequent segments in one or more representations, wherein generation of the request for the segment of the MPD comprises: causing execution of a rate adaptation algorithm using the caching status and the one or more bitrate related parameters and causing selection of the segment based at least in part on the results of executing the rate adaptation algorithm;

generate a request for pre-fetching one or more segments different from the requested segment; and provide for transmission of the request for the segment and the request for pre-fetching the one or more different segments to a proxy cache server.

14. The computer program product of claim 13, wherein the program code, when executed by the apparatus, further causes the apparatus at least to:

generate a request for the caching status associated with at least one segment of the MPD;

provide for transmission of the request for the caching status to the proxy cache server; and receive the caching status associated with the at least one segments.

15. The computer program product of claim 14, wherein the program code that causes the apparatus to generate the request for a segment of the MPD, when executed by the apparatus, further causes the apparatus at least to select the segment based at least in part on the received caching status.

16. The computer program product of claim 14, wherein the program code that causes the apparatus to generate the request for pre-fetching the one or more different segments, when executed by the apparatus, further causes the apparatus at least to select the one or more different segments based at least in part on the received caching status.

17. The computer program product of claim 16, wherein the program code that causes the apparatus to select the one or more different segments based at least in part on the received caching status, when executed by the apparatus, further causes the apparatus at least to:

execute a rate adaptation algorithm using the received caching status; and select the one or more different segments based at least in part on the results of executing the rate adaptation algorithm.

* * * * *